US011140549B2

(12) United States Patent
Itaya et al.

(10) Patent No.: US 11,140,549 B2
(45) Date of Patent: Oct. 5, 2021

(54) INFORMATION PROCESSING APPARATUS AND INFORMATION PROCESSING METHOD

(71) Applicant: SONY CORPORATION, Tokyo (JP)

(72) Inventors: Natsuki Itaya, Tokyo (JP); Kazuyuki Sakoda, Chiba (JP); Erika Saito, Tokyo (JP); Kenzoh Nishikawa, Kanagawa (JP); Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 15/781,784

(22) PCT Filed: Oct. 3, 2016

(86) PCT No.: PCT/JP2016/079222
§ 371 (c)(1),
(2) Date: Jun. 6, 2018

(87) PCT Pub. No.: WO2017/115515
PCT Pub. Date: Jul. 6, 2017

(65) Prior Publication Data
US 2018/0367993 A1 Dec. 20, 2018

(30) Foreign Application Priority Data
Dec. 28, 2015 (JP) .................................. 2015-255715

(51) Int. Cl.
*G06F 21/00* (2013.01)
*H04W 12/06* (2021.01)
(Continued)

(52) U.S. Cl.
CPC ............ *H04W 12/06* (2013.01); *H04W 4/08* (2013.01); *H04W 76/10* (2018.02); *G06F 21/44* (2013.01);
(Continued)

(58) Field of Classification Search
CPC ..................................................... H04W 12/06
See application file for complete search history.

(56) References Cited

U.S. PATENT DOCUMENTS 9,418,236 B2 * 8/2016 Cabrera .................. G06F 21/62
9,591,541 B2 * 3/2017 Zhao ...................... H04W 36/22
(Continued)

FOREIGN PATENT DOCUMENTS

| AT | 341168 T | 10/2006 |
|----|----------|---------|
| CN | 1633787 A | 6/2005 |

(Continued)

OTHER PUBLICATIONS

International Search Report and Written Opinion of PCT Application No. PCT/JP2016/079222, dated Dec. 20, 2016, 11 pages of ISRWO.

(Continued)

*Primary Examiner* — Josnel Jeudy
(74) *Attorney, Agent, or Firm* — Chip Law Group

(57) ABSTRACT

To keep safety of a network and to facilitate connection to the network. An information processing apparatus comprises a communication unit and a control unit. The communication unit is directed for receiving a connection authentication request from a new device other than a plurality of devices configuring a network in which the plurality of devices make wireless communication on a one-to-one basis to be mutually connected. Further, the control unit is directed for transferring the connection authentication request to the plurality of devices in a case of receiving the connection authentication request, and for performing control to permit the new device to connect to the network on the basis of the responses to the connection authentication request from the plurality of devices.

16 Claims, 18 Drawing Sheets

(51) Int. Cl.
  *H04W 76/10*   (2018.01)
  *H04W 4/08*   (2009.01)
  *H04W 84/18*   (2009.01)
  *H04W 60/00*   (2009.01)
  *G06F 21/44*   (2013.01)
  *H04W 76/14*   (2018.01)
  *H04L 29/08*   (2006.01)
  *H04W 76/23*   (2018.01)
  *H04L 29/06*   (2006.01)

(52) U.S. Cl.
  CPC .......... *H04L 63/10* (2013.01); *H04L 67/1046* (2013.01); *H04W 60/00* (2013.01); *H04W 76/14* (2018.02); *H04W 76/23* (2018.02); *H04W 84/18* (2013.01)

(56) References Cited

U.S. PATENT DOCUMENTS

| | | | |
|---|---|---|---|
| 10,225,157 | B2 * | 3/2019 | Cordray ................ H04L 63/10 |
| 2002/0168992 | A1 | 11/2002 | Eiden et al. |
| 2004/0266404 | A1 | 12/2004 | Nasu et al. |
| 2006/0035644 | A1 | 2/2006 | Niwano et al. |
| 2007/0198673 | A1 | 8/2007 | Heen et al. |
| 2012/0207023 | A1 * | 8/2012 | Tsuda .................... H04W 48/06 370/235 |
| 2012/0278389 | A1 | 11/2012 | Thangadorai |
| 2013/0294230 | A1 * | 11/2013 | Popa ..................... H04W 36/22 370/230 |
| 2015/0074540 | A1 | 3/2015 | Moritomo |
| 2015/0181633 | A1 | 6/2015 | Kim et al. |
| 2016/0180072 | A1 * | 6/2016 | Ligatti ................ H04L 63/0853 726/7 |

FOREIGN PATENT DOCUMENTS

| | | |
|---|---|---|
| CN | 1751534 A | 3/2006 |
| CN | 1922831 A | 2/2007 |
| CN | 104221466 A | 12/2014 |
| DE | 60214927 T2 | 3/2007 |
| EP | 1257144 A2 | 11/2002 |
| EP | 1530853 A2 | 5/2005 |
| EP | 1599060 A1 | 11/2005 |
| EP | 1716675 A1 | 11/2006 |
| EP | 2519071 A2 | 10/2012 |
| EP | 2837254 A1 | 2/2015 |
| FI | 20010986 A | 11/2002 |
| JP | 2003-324449 A | 11/2003 |
| JP | 2004-104774 A | 4/2004 |
| JP | 2005-311527 A | 11/2005 |
| JP | 2007-019818 A | 1/2007 |
| JP | 2009-130400 A | 6/2009 |
| JP | 2010-157098 A | 7/2010 |
| JP | 2011-035669 A | 2/2011 |
| JP | 4658973 B2 | 3/2011 |
| JP | 2013-223034 A | 10/2013 |
| JP | 2015-046774 A | 3/2015 |
| KR | 10-2005-0031454 A | 4/2005 |
| KR | 2006-0125851 A | 12/2006 |
| KR | 10-2013-0090300 A | 8/2013 |
| KR | 10-2015-0006848 A | 1/2015 |
| KR | 10-2015-0063376 A | 6/2015 |
| WO | 2004/019566 A2 | 3/2004 |
| WO | 2005/079018 A1 | 8/2005 |
| WO | 2005/079097 A1 | 8/2005 |
| WO | 2013/153759 A1 | 10/2013 |
| WO | 2014/027840 A1 | 2/2014 |

OTHER PUBLICATIONS

Extended European Search Report of EP Patent Application No. 16881495.2, dated Aug. 30, 2018, 10 pages.

Office Action for JP Patent Application No. 2017-558862 dated Jul. 14, 2020, 03 pages of Office Action and 03 pages of English Translation.

Office Action for EP Patent Application No. 16881495.2-1218, dated Feb. 2, 2020, 05 pages of Office Action.

* cited by examiner

EXEMPLARY DISPLAY IN SELECTING NETWORK
FOR WHICH CONNECTION AUTHENTICATION IS REQUESTED

EXEMPLARY DISPLAY IN NOTIFICATION OF
DEVICE REQUESTING CONNECTION AUTHENTICATION

EXEMPLARY DISPLAY IN NOTIFICATION OF AUTHENTICATION SITUATIONS OF DEVICES BELONGING TO NETWORK

EXEMPLARY OPERATIONS OF INFORMATION PROCESSING APPARATUS
REQUESTING CONNECTION AUTHENTICATION

EXEMPLARY OPERATIONS OF INFORMATION PROCESSING APPARATUS BELONGING TO NETWORK

EXEMPLARY OPERATIONS IN AUTOMATICALLY MAKING
CONNECTION AUTHENTICATION RESPONSE BASED ON Capability

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/079222 filed on Oct. 3, 2016, which claims priority benefit of Japanese Patent Application No. JP 2015-255715 filed in the Japan Patent Office on Dec. 28, 2015. Each of the above-referenced applications is hereby incorporated herein by reference in its entirety.

TECHNICAL FIELD

The present technology relates to an information processing apparatus. More specifically, the present technology relates to an information processing apparatus and an information processing method for handling information to be exchanged via wireless communication, as well as a program for causing a computer to perform the method.

BACKGROUND ART

There has been conventionally present a wireless communication technology for exchanging information via wireless communication. Further, there is present, for example, a wireless communication technology for constructing a network by interconnecting a plurality of devices. Herein, in a case where a new device other than the devices belonging to a network participates in the network, it is important to keep safety of the network and to facilitate the new device to participate in the network.

For example, there has been proposed a group list management apparatus for determining whether to register in a group in response to a new registration request depending on a vote result by already-registered members of a group list when receiving the new registration request to the group list of the group (see Patent Document 1, for example).

CITATION LIST

Patent Document

Patent Document 1:Japanese Patent Application Laid-Open No. 2007-19818

SUMMARY OF THE INVENTION

Problems to be Solved by the Invention

In the aforementioned conventional technology, a management apparatus for managing a group list determines whether to register in a group in response to a new registration request depending on a vote result by already-registered members of the group.

Herein, ad-hoc communication is proposed as a communication method for autonomously interconnecting with a surrounding device. Further, a plurality of devices are interconnected thereby to construct an ad-hoc network (mesh network). A management apparatus for managing each device configuring the network may not be present in the network in many cases. Also in the network, in a case where a new device other than the devices belonging to the network participates in the network, it is important to keep safety of the network and to facilitate the new device to participate in the network.

The present technology has been made in terms of the situations, and is directed for keeping safety of a network and facilitating connection to the network.

Solutions to Problems

The present technology has been made in order to eliminate the above problems, and a first aspect thereof provides an information processing apparatus including a communication unit configured to receive a connection authentication request from a new deice other than a plurality of devices configuring a network in which the plurality of devices including the information processing apparatus make wireless communication on a one-to-one basis to be mutually connected, and a control unit configured to transfer the connection authentication request to the plurality of devices in a case of receiving the connection authentication request, and to permit the new device to connect to the network on the basis of the responses to the connection authentication request from the plurality of devices, an information processing method, and a program for causing a computer to perform the method. There is thereby obtained an operation of transferring the connection authentication request to the plurality of devices in a case of receiving the connection authentication request, and permitting the new device to connect to the network on the basis of the responses to the connection authentication request from the plurality of devices.

Further, in the first aspect, the control unit may give the connection permission on the basis of the major responses from the plurality of devices. There is thereby obtained an operation of permitting connection on the basis of the major responses from the plurality of devices.

Further, in the first aspect, the control unit may give the connection permission on the basis of the responses from a predetermined number of devices having an authority to give connection permission among the plurality of devices. There is thereby obtained an operation of permitting connection on the basis of the responses from a predetermined number of devices having the authority to give connection permission among the plurality of devices.

Further, in the first aspect, the control unit may set the authority to give connection permission to a predetermined number of devices among the plurality of devices. There is thereby obtained an operation of setting the authority to give connection permission to a predetermined number of devices among the plurality of devices.

Further, in the first aspect, in a case where a device having the authority to give connection permission leaves the network, the control unit may perform control to assign the authority to give connection permission from the device which leaves to the devices other than the device which leaves among the plurality of devices. There is thereby obtained an operation of, in a case where a device having the authority to give connection permission leaves the network, assigning the authority to give connection permission from the device which leaves to the devices other than the device which leaves among the plurality of devices.

Further, in the first aspect, the control unit may set a priority of the authority to give connection permission, and give the connection permission on the basis of the responses from the devices having the authority to give connection permission set with a priority meeting a predetermined standard. There is thereby obtained an operation of setting a priority to the authority to give connection permission, and permitting connection on the basis of the responses from the devices having the authority to give connection permission set with a priority meeting a predetermined standard.

Further, in the first aspect, in a case of receiving the connection authentication request, the plurality of devices may notify the user of the reception of the connection authentication request, and make the response on the basis of an approval operation of the user for the connection authentication request. There is thereby obtained an operation of, in a case of receiving the connection authentication request, notifying the user of the reception of the connection authentication request, and making the response on the basis of an approval operation of the user for the connection authentication request.

Further, in the first aspect, in a case of receiving the connection authentication request, the plurality of devices may make the response on the basis of Capability of the new device. There is thereby obtained an operation of, in a case of receiving the connection authentication request, making the response on the basis of Capability of the new device.

Further, in the first aspect, in a case where identification information output from the new device is received in a reception unit, the control unit may permit the new device to connect to the network. There is thereby obtained an operation of, in a case where identification information output from the new device is received in the reception unit, permitting the new device to connect to the network.

Further, in the first aspect, in a case of receiving the connection authentication request, the plurality of devices may transmit the responses to the connection authentication request to other devices, and notify the users of the contents of the responses of other devices. There is thereby obtained an operation of, in a case of receiving the connection authentication request, transmitting the response to the connection authentication request to other devices, and notifying the user of the contents of the responses of other devices.

Further, a second aspect of the present technology provides an information processing apparatus including a communication unit configured to transmit a connection authentication request to a network in which a plurality of devices make wireless communication on a one-to-one basis to be mutually connected to at least one of the plurality of devices, and a control unit configured to perform a connection processing of connection to the network on the basis of connection setting information transmitted when connection is permitted in response to the connection authentication request on the basis of the responses to the connection authentication request from the plurality of devices, an information processing method, and a program for causing a computer to perform the method. There is thereby obtained an operation of performing the connection processing of connecting to the network on the basis of the connection setting information transmitted when connection is permitted in response to the connection authentication request on the basis of the responses to the connection authentication request from the plurality of devices.

Further, in the second aspect, the control unit may perform control to notify the user of the information associated with the plurality of devices or the network, and to transmit the connection authentication request to at least one of a plurality of devices configuring a network selected on the basis of the user selection operation. There is thereby obtained an operation of notifying the user of the information associated with the plurality of devices or the network, and transmitting the connection authentication request to at least one of a plurality of devices configuring a network selected on the basis of the user selection operation.

Further, in the second aspect, the control unit may perform control to transmit the connection authentication request to at least one of a plurality of devices configuring a network selected on the basis of Capability of the plurality of devices. There is thereby obtained an operation of transmitting the connection authentication request to at least one of a plurality of device configuring a network selected on the basis of Capability of the plurality of devices.

Further, a third aspect of the present technology provides an information processing apparatus including a control unit configured to perform control to determine a device which generates connection setting information in order to perform a connection processing among a plurality of devices from among the plurality of devices in a case of constructing a network is constructed in which the plurality of devices including the information processing apparatus make wireless communication on a one-to-one basis to be mutually connected, an information processing method, and a program for causing a computer to perform the method. There is thereby obtained an operation of determining a device which generates the connection setting information in order to perform the connection processing among a plurality of devices in a case of constructing a network.

Further, in the third aspect, the control unit may determine the device which generates connection setting information by use of information included in a signal providing notification of the presence of the device. There is thereby obtained an operation of determining a device which generates the connection setting information by use of information included in a signal providing notification of the presence of the device.

Effects of the Invention

According to the present technology, an excellent effect to keep safety of a network and to facilitate connection to the network can be obtained. Additionally, the effects described herein are not necessarily restrictive, and any effect described in the present disclosure can be obtained.

MODE FOR CARRYING OUT THE INVENTION

A form embodying the present technology (which will be denoted as embodiment below) will be described below. The description will be made in the following order.

1. Embodiment (example to permit new device to connect to network on the basis of connection authentication responses from a plurality of devices in a case where devices belonging to network receive connection authentication request)

2. Applied examples

1. Embodiment

[Exemplary Configuration of Communication System]

Figure 1:
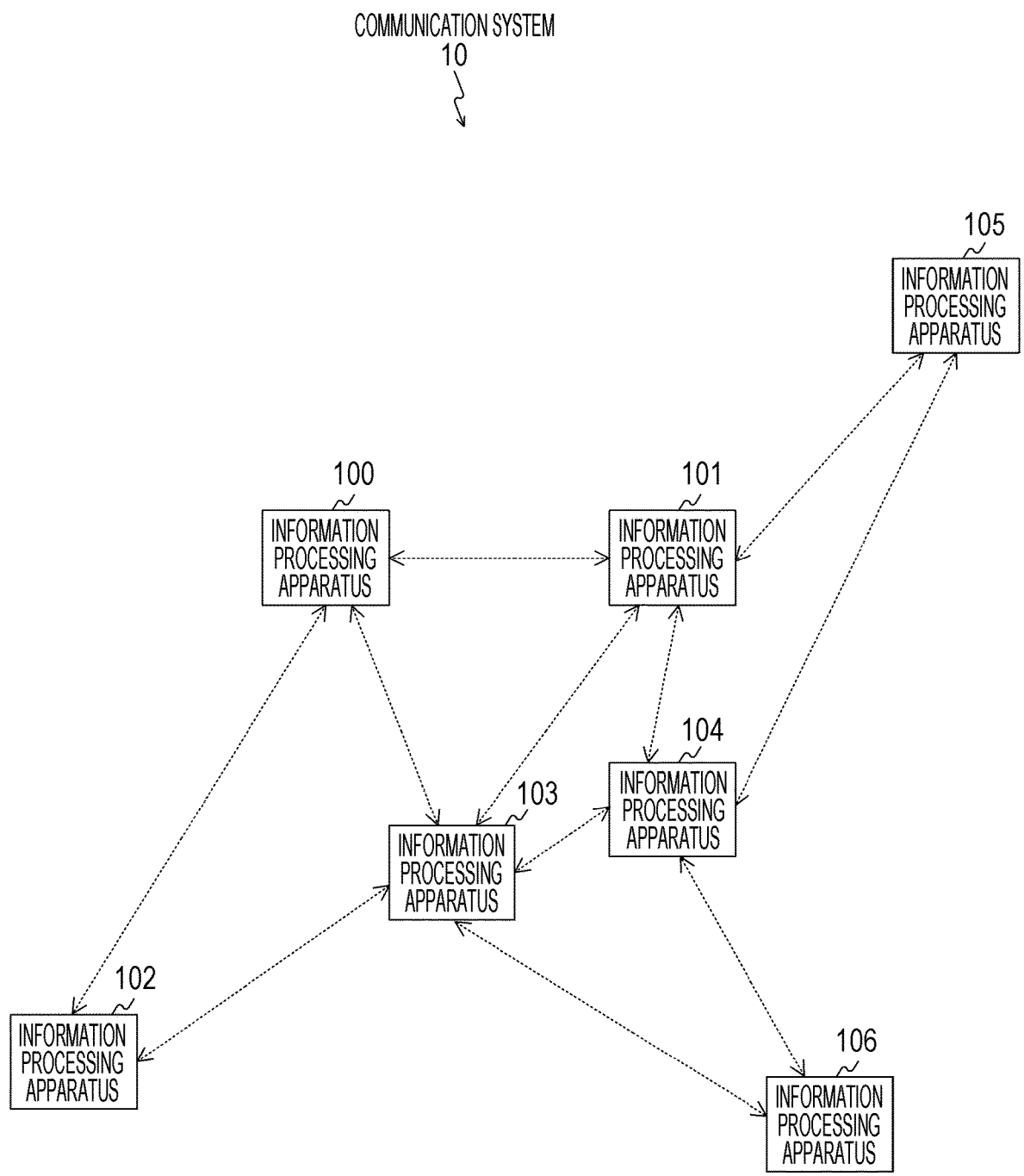
FIG. 1 is a diagram illustrating an exemplary system configuration of a communication system 10 according to an embodiment of the present technology.

FIG. 1 is a diagram illustrating an exemplary system configuration of a communication system 10 according to an embodiment of the present technology.

The communication system 10 includes information processing apparatuses 100 to 106. The information processing apparatuses 100 to 106 are portable information processing apparatuses or fixed information processing apparatuses having a wireless communication function, for example. Additionally, the portable information processing apparatuses are information processing apparatuses such as Smartphone, cell phone, tablet terminal, game player, reproduction apparatus (for image reproduction or music reproduction), and shooting apparatus, for example. Further, the fixed information processing apparatuses are information processing apparatuses (information processing apparatuses connected to a power supply for use, for example) such as printer, personal computer, TV, or various home appliances, for example.

For example, the information processing apparatuses 100 to 106 are assumed to belong to the same network at L2 (second layer: datalink layer), and each of the information processing apparatuses is assumed to make communication at L3 (third layer: network layer) or higher as needed. For example, a mesh network in the institute of electrical and electronics engineers (IEEE) 802.11s uses the same service set identifier (SSID) and a passphrase. Further, the information processing apparatuses can mutually communicate at any place in the network by use of a L3 network framework such as Internet protocol (IP).

Further, each information processing apparatus belonging to the same network can connect at any place if it is present within its service area. For example, in a case of a mesh network in the IEEE 802.11s, if information processing apparatuses belonging to the same network are present within a service area, connection with the information processing apparatuses can be established, thereby obtaining connectivity for the entire network.

Herein, ad-hoc communication, ad-hoc network, mesh network, and the like are known as a communication method for autonomously interconnecting with a neighboring information processing apparatus. In the network, each information processing apparatus can make mutual communication with a neighboring information processing apparatus without depending on a master station (such as control apparatus).

For example, autonomous interconnection with a neighboring information processing apparatus can be made in a communication method such as wireless fidelity (Wi-Fi (registered trademark)) or Bluetooth (registered trademark).

For example, the mesh network in the IEEE802.11s is characterized in that relationships between devices are equal. That is, the mesh network in the IEEE 802.11s can configure a mesh network not in a master-slave relationship such as Wi-Fi. Further, the mesh network in the IEEE 802.11s is characterized by automatically switching path selection. That is, in a case where a link is disconnected, the mesh network in the IEEE 802.11s can automatically switch to a path using other link. Further, the mesh network in the IEEE 802.11s is characterized by controlling transmission power. That is, the mesh network in the IEEE 802.11s controls the transmission power of each information processing apparatus thereby to change a destination distance or to change a communication speed. Further, the mesh network in the IEEE 802.11s is characterized by performing time synchronization among the information processing apparatuses. For example, the mesh network in the IEEE 802.11s can perform time synchronization on the order of m seconds.

Thus, a communication method for autonomously interconnecting with a neighboring information processing apparatus will be described byway of a mesh network (ad-hoc network) in the IEEE 802.11s according to the embodiment of the present technology.

For example, when a new information processing apparatus is added in vicinity in an ad-hoc network, the new information processing apparatus can freely participate in the network, too. For example, there will be first assumed that only the information processing apparatuses 100 to 104 among the information processing apparatuses 100 to 106 participate in an ad-hoc network. In this case, it is assumed that the information processing apparatus 105 and the information processing apparatus 106 are sequentially added. In this case, the coverage of the network can be increased along with an increase in information processing apparatuses (neighboring information processing apparatuses). That is, as the information processing apparatus 105 and the information processing apparatus 106 are sequentially added, the coverage of the network can be increased.

Herein, each information processing apparatus can transfer information to be exchanged with other information processing apparatuses in a bucket brigade manner, not only being autonomously interconnected with a neighboring information processing apparatus.

For example, it is assumed that the information processing apparatus 100 can directly communicate with the information processing apparatuses 101 to 103 but cannot directly communicate with the information processing apparatuses 104 to 106 due to out of the service or the like.

Also in a case where direct communication is impossible in this way, the information processing apparatuses (information processing apparatuses 101 to 103) capable of directly communicating with the information processing apparatus 100 can transfer the data of the information processing apparatus 100 to the information processing apparatuses 104 to 106. Thus, the data is transferred in this way so that the information processing apparatus 100 can mutually exchange information with the information processing apparatuses 104 to 105 which cannot directly communicate with the information processing apparatus 100 via any of the information processing apparatuses 101 to 103.

The method for mutually transferring data (or in a bucket brigade manner) and sending information to a distant information processing apparatus is called multihop relay. Further, a network for performing multihop is generally known as mesh network.

As described above, there will be described, according to the embodiment of the present technology, an exemplary system in which each information processing apparatus autonomously interconnects with an information processing apparatus in the same network thereby to totally configure one network like the mesh network in the IEEE 802.11s. In the system, an information processing apparatus (such as parent machine) for entire control is not present. Further, each information processing apparatus confirms the destination of its received data. Each information processing apparatus then repeatedly transfers the data not destined thereto on the basis of its route information, thereby communicating with all the information processing apparatuses over the network.

Further, according to the embodiment of the present technology, a mesh identifier (ID) for identifying a mesh network such as SSID of wireless local area network (LAN) system is used as connection setting information. The connection setting information is information for performing a connection processing among a plurality of devices, for example. Further, a passphrase can be used for constructing a secure network. Further, for example, the kind of an authentication protocol can be selected depending on how the passphrase is used. Further, notification of the kind of an authentication protocol can be provided on a beacon signal.

[Exemplary Functional Configuration of Information Processing Apparatus]

Figure 2:
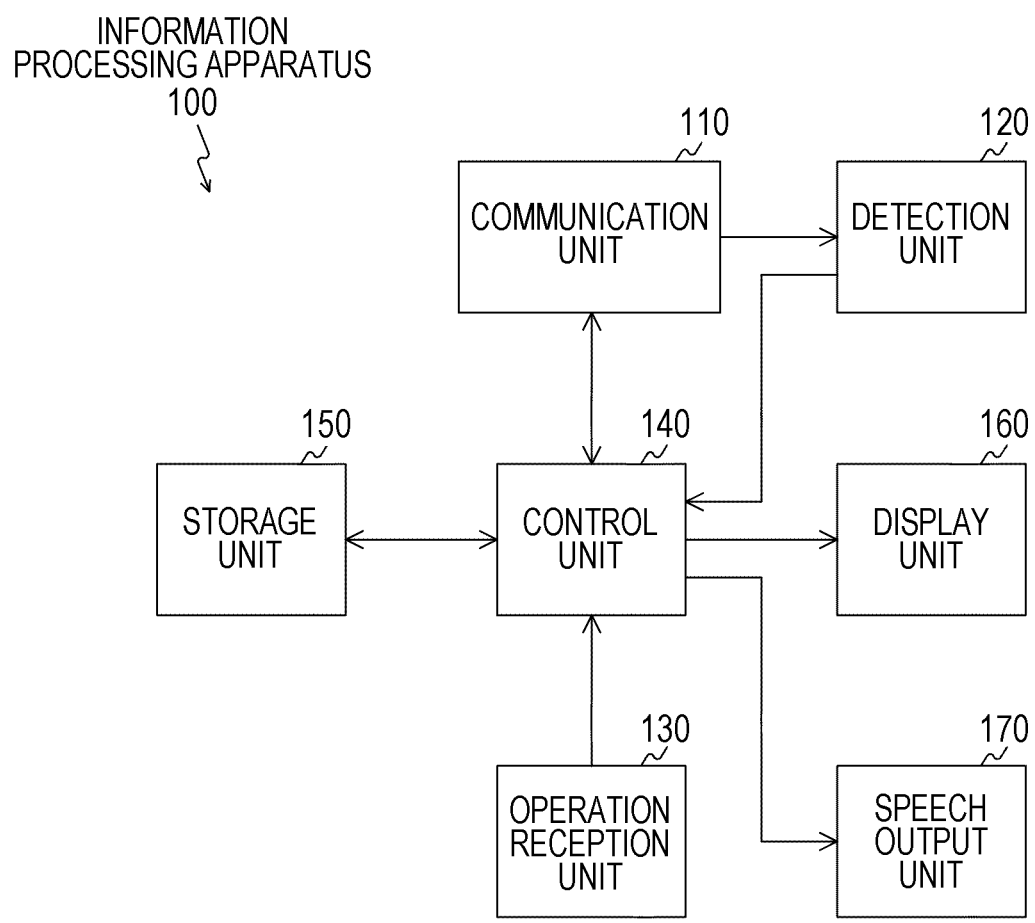
FIG. 2 is a block diagram illustrating an exemplary functional configuration of an information processing apparatus 100 according to the embodiment of the present technology.

FIG. 2 is a block diagram illustrating an exemplary functional configuration of the information processing apparatus 100 according to the embodiment of the present technology.

The information processing apparatus 100 includes a communication unit 110, a detection unit 120, an operation reception unit 130, a control unit 140, a storage unit 150, a display unit 160, and a speech output unit 170.

The communication unit 110 is directed for exchanging information with other information processing apparatuses (such as the information processing apparatuses 101 to 107) via wireless communication under control of the control unit 140. As described above, there will be assumed an example in which the communication unit 110 makes communication in the IEEE 802.11s protocol according to the embodiment of the present technology.

However, the communication unit 110 may make wireless communication in other wireless communication standard. For example, wireless local area network (LAN) can be employed. The wireless LAN may employ Wi-Fi (such as IEEE 802.11n), for example. Further, the wireless communication may employ wireless communication such as near field communication (NFC), Bluetooth (registered trademark), visible light communication, infrared ray, or cell phone radio, for example. Further the wireless communication may employ millimeter wave communication (such as 60 GHz), 900 MHz/2.4 GHz/5 GHz wireless LAN, or ultra wide band (UWB), for example.

Additionally, the communication unit 110 may make wireless communication by use of radio (electromagnetic wave) or may make wireless communication (such as wireless communication made by use of a magnetic field) using a medium other than radio. Further, the communication unit 110 may have a function of connecting to a public network such as a 3rd generation (3G) or Wi-Fi service area.

For example, the communication unit 110 exchanges a signal for generating or updating a multihop communication path with other information processing apparats via wireless communication under control of the control unit 140.

Further, for example, the communication unit 110 receives a connection authentication request from a new device other than the devices configuring the network in which a plurality of devices make wireless communication on a one-to-one basis thereby to be mutually connected. Further, for example, the communication unit 110 transmits a connection authentication request for the network in which a plurality of devices make wireless communication on a one-to-one basis thereby to be mutually connected to at least one of the plurality of devices.

The detection unit 120 is directed for detecting an information processing apparatus which leaves the network configured of a plurality of information processing apparatuses via autonomous wireless communication on the basis of the information from the communication unit 110, and outputs the detection result to the control unit 140. For example, the detection unit 120 can detect whether its apparatus (the information processing apparatus 100) leaves the network. Further, the detection unit 120 can detect whether other information processing apparatus belonging to the network leaves the network. Furthermore, the detection unit 120 can detect an information processing apparatus which has not left the network but is leaving. The detection can be performed on the basis of a reception signal intensity or the like of the self-apparatus or other device, for example.

The operation reception unit 130 is directed for receiving user's operation input, and outputs operation information based on the contents of the received operation input to the control unit 140. The operation reception unit 130 is realized by touch panel, keyboard, or mouse, for example.

The control unit 140 is directed for controlling each unit in the information processing apparatus 100 on the basis of a control program stored in the storage unit 150. For example, the control unit 140 performs various processings such as signal processing on exchanged information, interpretation of exchanged data, and generation of various items of data. Further, the control unit 140 is realized by central processing unit (CPU), for example.

Further, the control unit 140 can determine whether an information processing apparatus which is leaving the network has been detected on the basis of the detection result output from the detection unit 120, for example. In a case where an information processing apparatus which is leaving the network has been detected, the control unit 140 then performs control to output the information indicating the detected information processing apparatus as leave information. For example, the control unit 140 can issue, to the user, an alert that an information processing apparatus which is leaving the network has been detected by use of image display of the display unit 160 or speech output of the speech output unit 170.

The storage unit 150 is a memory configured to store various items of information. For example, the storage unit 150 stores various items of information (such as control program) required by the information processing apparatus 100 for performing desired operations.

For example, in transmitting data via wireless communication, the control unit 140 processes the information or the like read from the storage unit 150, and generates a chunk (transmission packet) of data to be actually transmitted. Subsequently, the control unit 140 outputs the generated transmission packet to the communication unit 110. Further, the communication unit 110 converts the transmission packet into a format or the like of the communication system for actually sending the transmission packet, and then transmits the converted transmission packet from an antenna (not illustrated) to the outside.

Further, in receiving data via wireless communication, for example, the communication unit 110 extracts a reception packet by a signal processing performed by a receiver in the communication unit 110 on a radio signal received via the antenna (not illustrated). The control unit 140 then interprets the extracted reception packet. In a case where the data is determined to be held as a result of the interpretation, the control unit 140 writes the data in the storage unit 150. Further, in a case where the data is determined to be transferred to other information processing apparatus, the control unit 140 outputs the data as a transmission packet to be transferred to other information processing apparatus to the communication unit 110.

The display unit 160 is directed for displaying various items of information under control of the control unit 140. Additionally, the display unit 160 may employ a display panel such as organic electro luminescence (EL) panel or liquid crystal display (LCD) panel, for example. Additionally, the operation reception unit 130 and the display unit 160 can be integrally configured by use of a touch panel by which the user can input an operation by contacting or moving his/her finger close to the display face.

The speech output unit 170 is directed for outputting various speeches under control of the control unit 140. Additionally, the speech output unit 170 is realized by speaker, for example.

Additionally, the functional configuration of other information processing apparatuses (the information processing apparatuses 101 to 107) is substantially the same as that of the information processing apparatus 100, and thus the description thereof will be omitted. However, each configuration of the storage unit 150, the display unit 160, the speech output unit 170, or the like can be different per information processing apparatus depending on a service used on the constructed network.

Herein, a means for making secure communication is defined for the mesh network defined in the IEEE 802.11s, for example. For example, a protocol for generating a temporary key used for encrypting a communication path by use of a mesh ID and a passphrase is defined for the means for making secure communication. Additionally, the mesh ID is identification information for identifying a mesh network, such as SSID. Further, the passphrase generally means information with more characters than a password. For example, the passphrase is configured in combination of a predetermined number or more of characters (such as alphameric characters) and symbols.

However, the protocol does not consider whether to distribute the mesh ID and the passphrase to the information processing apparatuses (or new information processing apparatus) configuring the network.

Further, it is important that the connection setting information (security setting information) can be easily exchanged in the wireless communication system such as mesh network in the IEEE 802.11s capable of constructing a network in an ad-hoc manner. However, a method for exchanging a mesh ID and a passphrase is not defined at present, and they are difficult to easily exchange.

Thus, according to the embodiment of the present technology, there will be described an example in which safety of a network is kept and connection setting information (security setting information) is easily exchanged in a wireless communication system such as mesh network. Thereby, it is possible to keep safety of a network and to easily connect to the network.

[Example of Adding New Information Processing Apparatus to Network]

Figure 3:
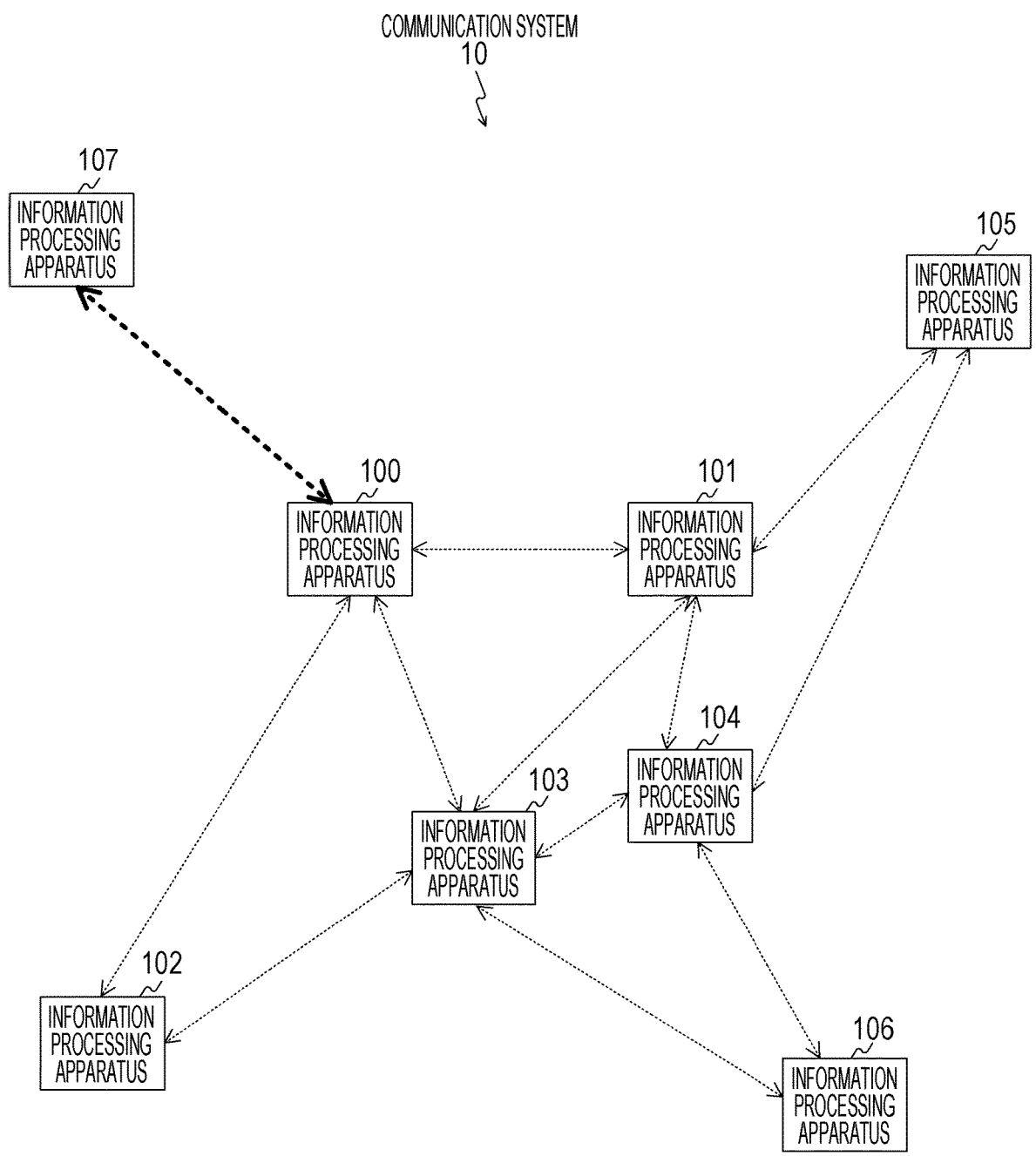
FIG. 3 is a diagram illustrating an exemplary system configuration of the communication system 10 according to the embodiment of the present technology.

FIG. 3 is a diagram illustrating an exemplary system configuration of the communication system 10 according to the embodiment of the present technology. The communication system 10 is an exemplary network in which the new information processing apparatus 107 is added in the communication system 10 illustrated in FIG. 1. Exemplary communication in this case will be described in detail with reference to FIG. 7.

[Exemplary Display in Starting Connection Authentication Request]

Figure 4:
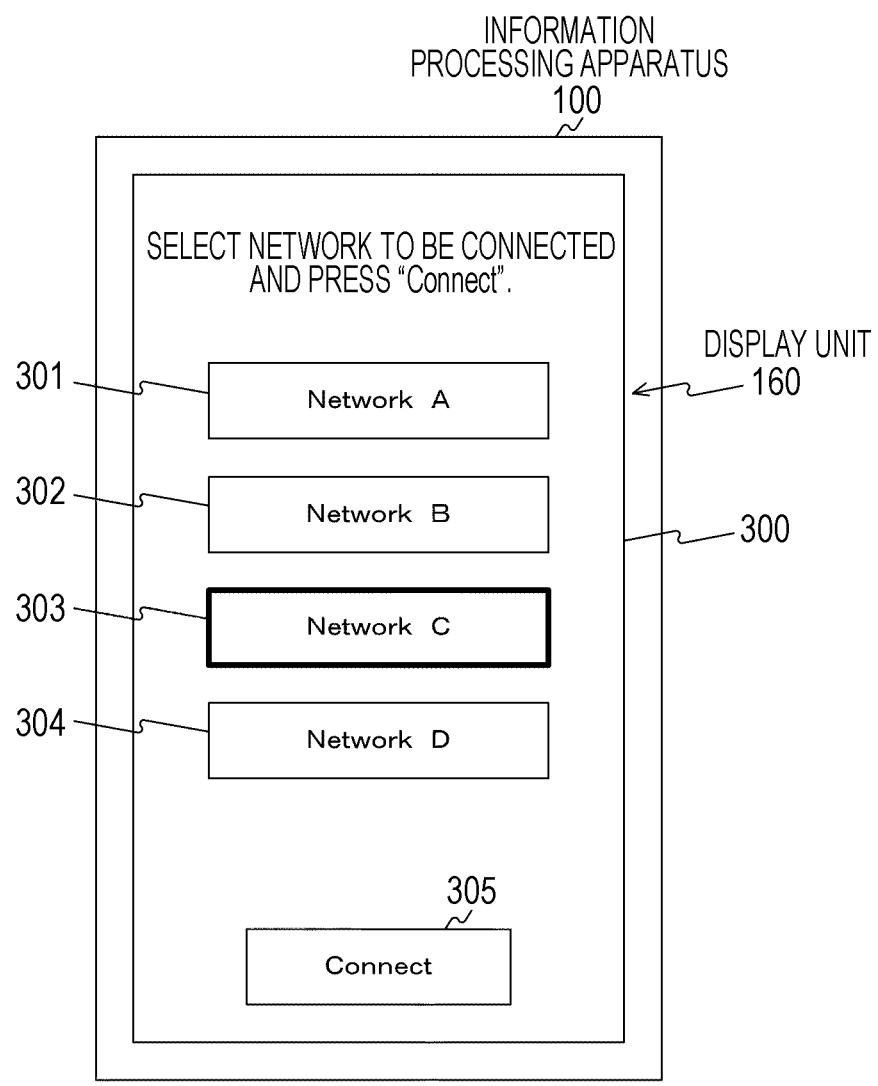
FIG. 4 is a diagram illustrating exemplary display of a display screen displayed on each device configuring the communication system 10 according to the embodiment of the present technology.
Figure 5:
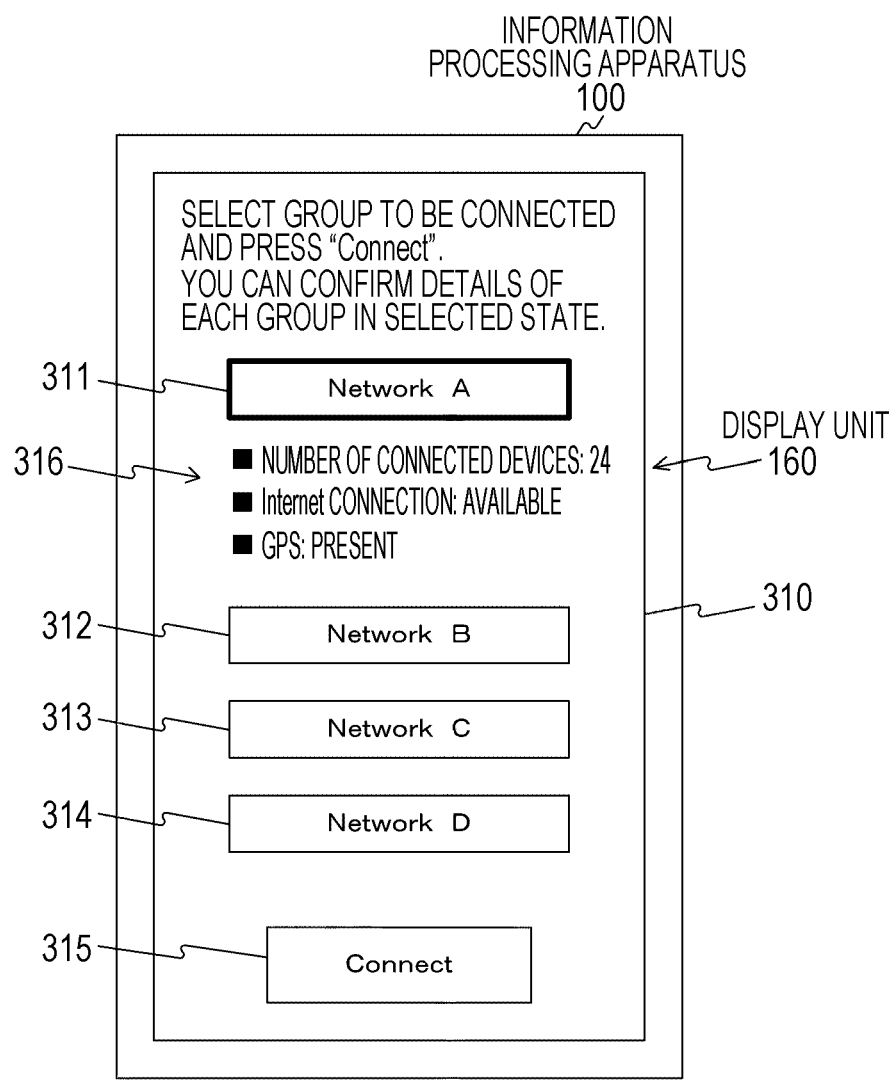
FIG. 5 is a diagram illustrating exemplary display of a display screen displayed on each device configuring the communication system 10 according to the embodiment of the present technology.

FIG. 4 and FIG. 5 are diagrams illustrating exemplary display of display screens displayed on each device configuring the communication system 10 according to the embodiment of the present technology. Additionally, FIG. 4 and FIG. 5 illustrate exemplary display screens displayed on the display unit 160 of the information processing apparatus 100.

As illustrated in FIG. 4 and FIG. 5, in a case where the user causes the information processing apparatus 100 to participate in a new network, he/she displays the display screens 300 and 310 for selecting a desired network to be connected on the display unit 160.

The display screen 300 illustrated in FIG. 4 displays selection buttons 301 to 304 and a connection authentication request button 305.

The selection buttons 301 to 304 indicate networks (mesh networks) to which the information processing apparatus 100 can connect, and are directed for selecting a new network in which the information processing apparatus 100 participates via a user operation. FIG. 4 illustrates an example in which networks A to D are displayed as networks to which the information processing apparatus 100 can connect. Further, a network to which the information processing apparatus 100 can connect is detected by the scanning operation by the information processing apparatus 100.

The connection authentication request button 305 is pressed when confirming the user's selection of a new network in which the information processing apparatus 100 participates. That is, the user presses any of the selection buttons 301 to 304 and then presses the connection authentication request button 305, thereby making the connection authentication request to the network corresponding to the pressed selection button.

The display screen 310 illustrated in FIG. 5 is a variant of the display screen 300 illustrated in FIG. 4. Specifically, the display screen 310 displays a network information display area 316 in addition to selection buttons 311 to 314 and a connection authentication request button 315. Additionally, the selection buttons 311 to 314 and the connection authentication request button 315 correspond to the selection buttons 301 to 304 and the connection authentication request button 305 illustrated in FIG. 4, respectively.

The network information display area 316 displays information associated with the networks corresponding to the selection buttons 311 to 314. FIG. 5 illustrates an example in which the network information display area 316 configured to display the information of the network A corresponding to the selection button 311 in the selected state is provided. Additionally, a network information display area may be provided for a plurality of networks.

As illustrated in FIG. 5, the network information display area 316 can display the number of devices (connected devices) belonging to the network A corresponding to the selection button 311, whether the network A is available for Internet connection, and whether global positioning system (GPS) information can be acquired. Additionally, this is exemplary, and other information indicating the network can be displayed in the network information display area, for example.

For example, information indicating a user who uses or owns a device belonging to the network can be displayed. The user information such as username/nickname, face image, social networking service (SNS) account information, and e-mail address can be displayed, for example.

Further, information indicating a device belonging to the network can be displayed, for example. The device information such as device identification information (including product name, serial number, user-designated device name, and device type (such as TV/Camera/Smartphone/PC/Sensor), for example) can be displayed, for example.

Further, information indicating the functions of a device belonging to the network can be displayed, for example. The device function information such as availability of Internet connection, availability of wired connection, availability of Cellar connection, network operator name, availability of Wi-Fi connection, availability of power-supply connection, presence of provided GPS information can be displayed, for example. Further, the device function information such as presence of provided compass information, presence of provided temperature information, presence of screen display, presence of input device (such as keyboard, mouse, or touch panel), presence of speech input, presence of speech output, and the maximum number of connectable devices can be displayed, for example.

Further, information indicating the network can be displayed, for example. The network information such as authority given in participating in the network can be displayed, for example.

[Exemplary Display in Making Connection Authentication]

Figure 6:
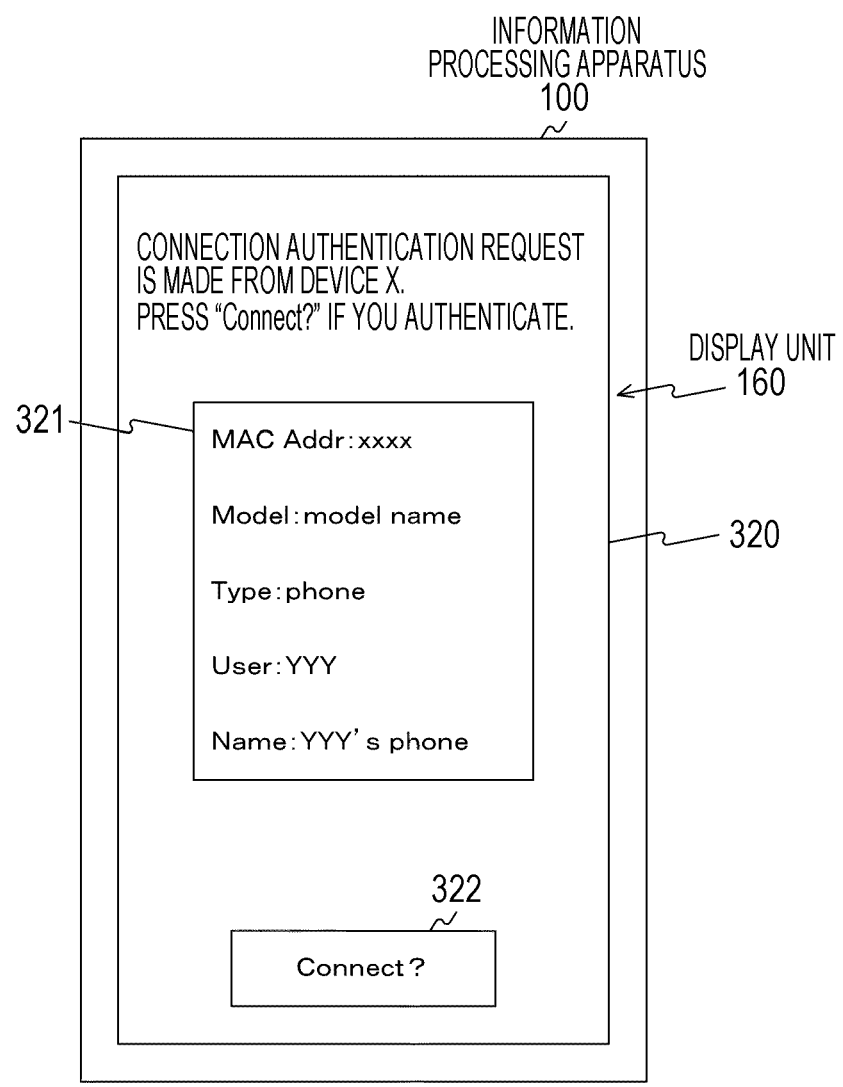
FIG. 6 is a diagram illustrating exemplary display of a display screen displayed on each device configuring the communication system 10 according to the embodiment of the present technology.

FIG. 6 is a diagram illustrating exemplary display of a display screen displayed on each device configuring the communication system 10 according to the embodiment of the present technology. Additionally, FIG. 6 illustrates an exemplary display screen displayed on the display unit 160 of the information processing apparatus 100.

As illustrated in FIG. 6, the information processing apparatus 100 which directly or indirectly receives a connection authentication request from other device displays a display screen 320 for providing notification of the fact and the device information on the display unit 160.

The display screen 320 displays a device information display area 321 and a connection permission button 322.

The device information display area 321 displays information indicating a desired device to be connected to the network to which the information processing apparatus 100 belongs. FIG. 6 illustrates that the device information such as media access control (MAC) address, model name, device type, user information, and device name is displayed by way of example. Additionally, this is exemplary, and other device information can be displayed in the device information display area.

For example, information indicating the user who uses or owns the device can be displayed. The user information such as username/nickname, face image, SNS account information, and e-mail address can be displayed, for example.

Further, information indicating a device can be displayed, for example. The device information such as device identification information (including product name, serial number, user-designated device name, and device type (such as TV/Camera/Smartphone/PC/Sensor), for example) can be displayed, for example.

Further, information indicating the functions of a device can be displayed, for example. The device function information such as availability of Internet connection, availability of wired connection, availability of Cellar connection, network operator name, availability of Wi-Fi connection, availability of power-supply connection, and presence of provided GPS information can be displayed, for example. Further, the device function information such as presence of provided compass information, presence of provided temperature information, presence of screen display, presence of input device (such as keyboard, mouse, or touch panel), presence of speech input, presence of speech output, and the maximum number of connectable devices can be displayed, for example.

Further, information desired for the network can be displayed, for example. The information desired for the network such as authority to be given in participating in the network can be displayed, for example.

The connection permission button 322 is pressed in a case where a device displayed in the device information display area 321 is permitted to participate in the network to which the information processing apparatus 100 belongs. Additionally, a button (connection refusal button) which is pressed in a case where a device displayed in the device information display area 321 is refused to participate in the network to which the information processing apparatus 100 belongs may be provided.

[Exemplary Communication]

Figure 7:
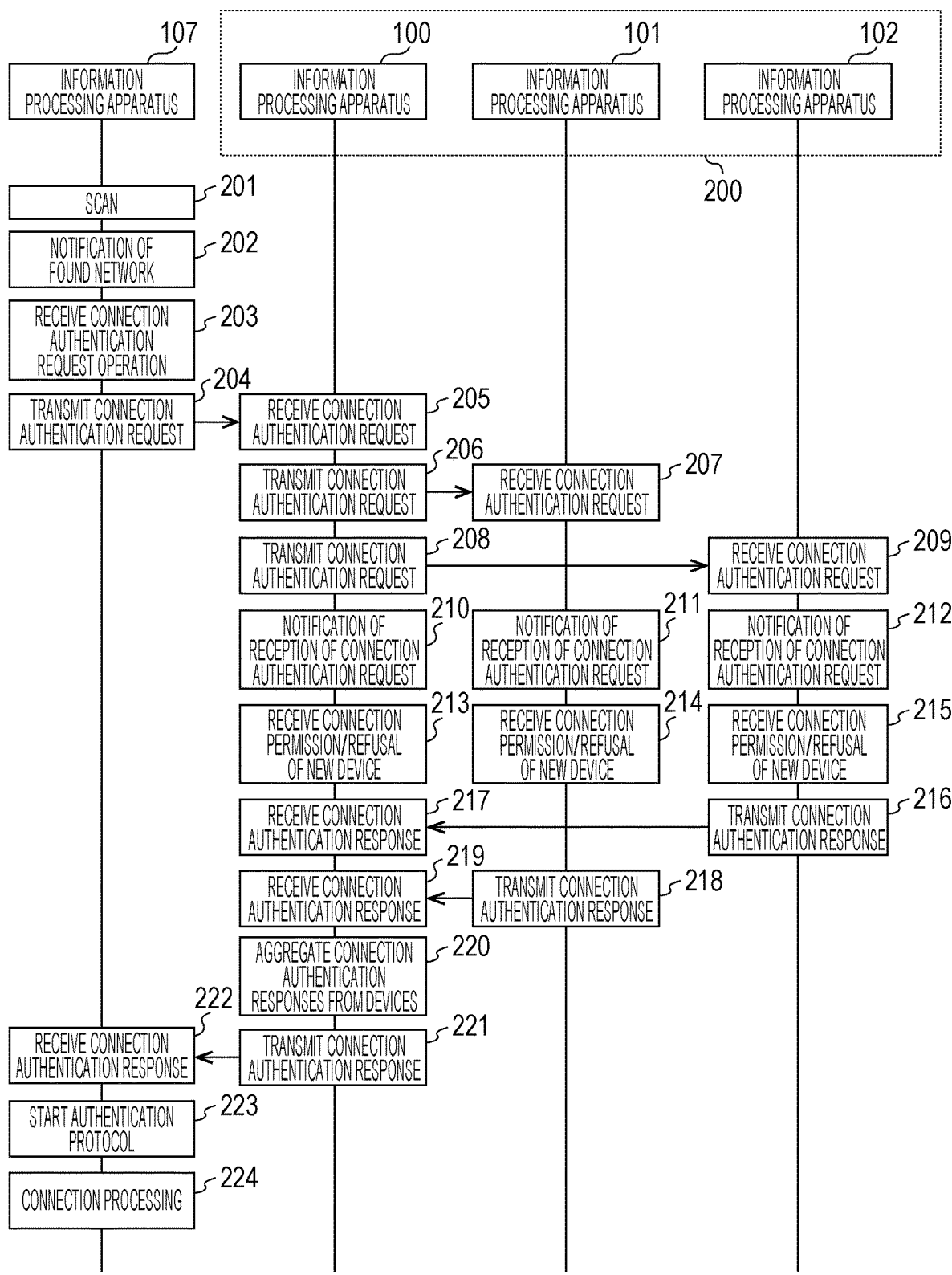
FIG. 7 is a sequence chart illustrating exemplary communication processings among devices configuring the communication system 10 according to the embodiment of the present technology.

FIG. 7 is a sequence chart illustrating exemplary communication processings among the devices configuring the communication system 10 according to the embodiment of the present technology. Additionally, FIG. 7 illustrates exemplary communication processings in a case where the information processing apparatuses 100 to 102 and 107 are present in the topology illustrated in FIG. 3. Further, FIG. 7 illustrates exemplary information exchanged among the information processing apparatuses 100 to 102 and 107 for simple description. Further, FIG. 7 assumes that a network 200 is configured of the information processing apparatuses 100 to 102.

Further, FIG. 7 illustrates that the information processing apparatus 107 participates in an existing network (network 200 to which the information processing apparatuses 100 to 102 belong) by way of example. Additionally, each of the information processing apparatuses 100 to 102 belonging to the existing network 200 regularly or irregularly outputs a signal (such as wireless LAN beacon) indicating that it belongs to the network.

At first, the control unit (corresponding to the control unit 140 illustrated in FIG. 2) of the information processing apparatus 107 (new device) scans around the information processing apparatus 107 (201). With the scanning, the information processing apparatus 107 receives a beacon from other device and detects the presence of the existing network (201). Additionally, the scanning is performed on the basis of a user operation, for example. Further, automatic scanning can be regularly or irregularly performed, for example.

Further, the control unit of the information processing apparatus 107 notifies the user of the network found by the scanning (202). For example, in a case where a plurality of networks A to D are found as illustrated in FIG. 4, the user is notified of the fact such that the plurality of networks A to D can be selected.

Subsequently, the user confirms such notification contents, and determines whether to make a connection authentication request to the found networks. In a case where the user makes a connection authentication request to the found networks, he/she then performs an operation of making a connection authentication request (203). For example, in a case where a plurality of networks A to D are found as illustrated in FIG. 4, the user presses a selection button and selects a network for which the connection authentication request is made, and presses the connection authentication request button 305 (203).

In a case where the user operation of making a connection authentication request is performed in this way (203), the control unit of the information processing apparatus 107 transmits the connection authentication request to at least one of the devices belonging to the network for which the connection authentication request is made (204). FIG. 6 illustrates an example in which the information processing apparatus 107 transmits the connection authentication request to the information processing apparatus 100 (204, 205).

Herein, the information processing apparatus 107 may transmit the connection authentication request to all the found devices among the devices belonging to the network for which the connection authentication request is made.

Further, for example, at least one of the devices (the devices found by the information processing apparatus 107) belonging to the network for which the connection authentication request is made may instruct the information processing apparatus 107 to transmit the connection authentication request to the device. In this case, the information processing apparatus 107 transmits the connection authentication request to the instructed device in response to the instruction.

Further, in a case where one network is found, for example, the connection authentication request may be automatically transmitted to the network. Further, in a case where a plurality of networks are found, for example, the connection authentication request may be automatically transmitted to one or a plurality of networks on the basis of Capability of the networks. The example will be described in detail with reference to FIG. 15.

Herein, for example, the connection authentication request may be transmitted as Action Frame defined in the IEEE 802.11. Further, for example, the connection authentication request may be transmitted by a beacon mounting the mesh ID of the network for which the connection authentication request is made thereon, and Special information element (IE) mounted on the beacon.

Further, the information mounted on the connection authentication request may be only the information indicating the connection authentication request, for example. Further, the information mounted on the connection authentication request may include each item of information associated with the transmission source (the information processing apparatus 107) of the connection authentication request, for example. Additionally, each item of information associated with the transmission source of the connection authentication request is Friendly Name, MAC Address, various Capability, and the like, for example. Further, a device to which the connection authentication request is transmitted can display each item of information associated with the transmission source of the connection authentication request (such as the information in the device information display area 321 illustrated in FIG. 6) on the basis of each item of information associated with the transmission source of the connection authentication request.

The information processing apparatus 100 (transfer source device) which receives the connection authentication request transfers the connection authentication request to other devices (the information processing apparatuses 101 and 102) belonging to the network of the information processing apparatus 100 in Broadcast (206 to 209). In this case, in a case where a device to which the connection authentication request cannot be directly transmitted is present, the information processing apparatus 100 transmits the connection authentication request to the device indirectly (via other device).

In this way, the transfer source device can transfer the connection authentication request to each device belonging to the network of the transfer source device in Broadcast. Further, the transfer source device may transfer the connection authentication request to each device belonging to the network of the transfer source device in Multiple-Unicast. Further, the transfer source device may transfer the connection authentication request in Broadcast by repeating Unicast transfer to Peer of the transfer source device, and Unicast transfer to Peer of the transfer destination device which receives.

Herein, it may be assumed that all the devices belonging to the network do not have the authority to give authentication permission. In this case, the connection authentication request may be transmitted only to a device having the approval authority among the devices belonging to the network in Multicast. Further, the connection authentication request may be transmitted only to a device having the authority to give authentication permission in Multiple-Unicast. Further, a device which first receives the connection authentication request may select a transfer destination device in any policy, and may transfer the connection authentication request thereto.

Further, the transfer source device may transfer the connection authentication request by use of Action Frame in the IEEE 802.11, for example. Further, the transfer source device may transfer the connection authentication request by use of a beacon, for example. Further, the transfer source device may transfer the connection authentication request by use of Broadcast, Multicast, or Unicast of IP Layer, for example. Further, the transfer source device can transfer the connection authentication request by use of an existing protocol such as universal plug and play (UPnP).

The control units of the information processing apparatuses 100 to 102 which receive the connection authentication request (directly or indirectly via other device) notify the user of the reception of the connection authentication request, respectively (210 to 212). For example, each information processing apparatus notifies the user of each information processing apparatus of the reception of the connection authentication request (information associated with the new device included in the connection authentication request, or the like as needed) by use of the information output unit (such as display or speaker) provided in each information processing apparatus. For example, the display screen 320 indicating that the connection authentication request has been made is displayed on the display unit 160 as illustrated in FIG. 6 and thus notification of the fact can be provided.

The user who is notified of the reception of the connection authentication request inputs whether to respond by use of the input device (such as keyboard or touch screen) (213 to 215). Further, the input method may employ a fingerprint sensor, an acceleration sensor, or the like, for example, for the inputting.

In this way, the response contents for the connection authentication request are determined on the basis of the user input or the like (213 to 215). That is, whether to permit or refuse connection for the information processing apparatus 107 is determined in any authentication method (213 to 215).

Additionally, in a case where the refusal operation is not performed for a certain period of time after the notification, the permission is assumed. Inversely, in a case where the permission operation is not performed for a certain period of time after the notification, the refusal may be assumed.

For example, in a case where the user determines to permit the new device to connect while the display screen 320 illustrated in FIG. 6 is displayed, he/she performs the user operation of pressing the connection permission button 322 (213 to 215). Further, for example, in a case where the user determines to refuse the new device while the display screen 320 illustrated in FIG. 6 is displayed, he/she does not press the connection permission button 322 (213 to 215).

Further, any preset rule is compared with the contents of the connection authentication request without the need of user confirmation, and the new device may be automatically permitted on the basis of the comparison result. Further, for example, the authority to determine connection authentication permission may be assigned to other device and the device assigned with the authority may determine connection permission.

In a case where the connection permission or refusal is determined in this way (214, 215), the control units of the information processing apparatuses 101 and 102 transmit the determined contents (authentication contents) as a connection authentication response to the transfer source device (the information processing apparatus 100) (216 to 219).

Herein, the connection authentication response may be transmitted in Unicast, for example. For example, the connection authentication response may be sequentially transmitted to an immediately-previous transfer source device in Unicast. In this case, the immediately-previous transfer source device sequentially transfers the connection authentication response to its more previous transfer source device, thereby responding to the first transfer source device (the information processing apparatus 100). Further, in this case, a transfer source device in the middle may aggregate the connection authentication response received from each transfer destination device to which it transfers, and its connection authentication response, thereby transmitting the connection authentication response to the immediately-previous transfer source device.

Further, the information processing apparatus 100 (transfer source device) determines whether to permit the information processing apparatus 107 to connect on the basis of the connection authentication responses received from the information processing apparatuses 101 and 102 and its determined contents (the connection authentication response) (220).

For example, the control unit 140 of the information processing apparatus 100 can determine to permit the information processing apparatus 107 to connect assuming that all the devices belonging to the network permit.

Further, for example, the control unit 140 of the information processing apparatus 100 can determine to permit the information processing apparatus 107 to connect assuming that all the connection authentication responses received by the timeout of all the devices belonging to the network indicate permission. In the cases, for example, in a case where at least one of the received connection authentication responses indicates refusal, it is possible to determine to refuse connection of the information processing apparatus 107.

Further, for example, the control unit 140 of the information processing apparatus 100 can determine to permit the information processing apparatus 107 to connect assuming that a certain rate of the received connection authentication responses indicate permission.

Further, for example, the control unit 140 of the information processing apparatus 100 can determine to permit the information processing apparatus 107 to connect assuming that the received connection authentication responses of over a certain rate of the devices belonging to the network indicate permission.

In this way, in a case where the control unit 140 of the information processing apparatus 100 receives the connection authentication request, it performs control to transfer the connection authentication request to a plurality of devices. Further, the control unit 140 of the information processing apparatus 100 can permit the new device to connect to the network on the basis of the responses (connection authentication responses) to the connection authentication request from the plurality of devices. In this case, for example, the control unit 140 of the information processing apparatus 100 can give connection permission on the basis of the major responses from the plurality of devices.

As described above, it is also assumed that all the devices belonging to the network do not have the authority to give authentication permission. In this case, the permission may be given only in a case where all the devices having the authority to give authentication permission among the devices belonging to the network permit. Further, it may be determined that the permission is given in a case where one or more of the devices having the authority to give authentication permission permit. Further, it may be determined that the permission is given in a case where a certain rate or more of the devices having the authority to give authentication permission permit. Further, in a case where a priority is given to the authority to give authentication permission, a possibility of a device with a high priority is weighted, and it may be determined whether the permission is given in consideration of all the responses and the priority-based weighting. Further, in a case where all the responses of one or more devices with the highest priority indicate permission, or only in a case where the responses of one or more devices with the highest priority are at a predetermined rate or more, it may be determined that the permission is given.

In this way, the control unit 140 of the information processing apparatus 100 can give connection permission on the basis of the responses from a predetermined number of devices having the authority to give connection permission among a plurality of devices. Further, the control unit 140 of the information processing apparatus 100 can set the authority to give connection permission to a predetermined number of devices among a plurality of devices.

Herein, it may be also assumed that a device having the authority to give connection permission leaves the network. In this case, the control unit 140 of the information processing apparatus 100 can control the authority to give connection permission to be assigned from the device which leaves to a device other than the device which leaves among the plurality of devices. For example, in a case where the control unit 140 of the information processing apparatus 100 detects a device which is leaving, it transmits the instruction information for assigning the authority to give connection permission to other device (such as device adjacent to the device which is leaving) to the device which is leaving. In this case, the control unit 140 of the information processing apparatus 100 transmits the instruction information for being assigned with the authority to give connection permission to a device to which the authority to give connection permission is to be assigned (such as a device adjacent to the device which is leaving). Additionally, a device which is leaving the network can be grasped on the basis of the detection result of the detection unit 120. For example, a device with the reception signal intensity at a threshold or less can be detected as a device which is leaving the network for the devices belonging to the network.

In this way, in a case where the information processing apparatus 107 is permitted/refused to connect, the control unit 140 of the information processing apparatus 100 may notify all the devices which return the connection authentication response of the determination result. Further, the control unit 140 of the information processing apparatus 100 may transmit the determination result to all the devices belonging to the network in Broadcast irrespective of whether the devices return the response.

For example, in a case where connection is not permitted, the control unit 140 of the information processing apparatus 100 transmits a connection refusal message as the connection authentication response to the information processing apparatus 107. In this case, the information processing apparatus 107 cannot connect to the network 200. Further, the control unit 140 of the information processing apparatus 100 does not respond to the information processing apparatus 107 (or due to timeout), thereby notifying the information processing apparatus 107 of the refusal.

Further, for example, in a case where connection is permitted, the control unit 140 of the information processing apparatus 100 transmits a connection permission message as the connection authentication response to the information processing apparatus 107 (221, 222).

In this way, in a case where the information processing apparatus 107 receives the connection permission message as the connection authentication response (222), it starts the authentication protocol (223), and performs the processing of connecting to the network 200 (224).

Further, for example, in a case where connection is permitted, the control unit 140 of the information processing apparatus 100 may immediately start the connection setting information exchanging protocol, and may perform the processing of connecting with the information processing apparatus 107.

The connection setting information exchanging protocol between the information processing apparatus 107 and the information processing apparatus 100 will be described herein. The connection setting information exchanging protocol may employ Wi-Fi protected setup (WPS), for example. Further, for example, the connection setting information maybe distributed by use of a communication path encrypted by a preset common key. Further, for example, the connection setting information may be distributed in a path other than the communication paths such as near field communication (NFC) and universal serial bus (USB) dongle in the protocol.

Additionally, the exemplary displays illustrated in FIG. 4 to FIG. 6 are exemplary, and other display screen may be employed. Thus, FIG. 8 to FIG. 10 illustrate other exemplary display.

[Exemplary Display in Making Connection Authentication Request by Personal Identification Number (PIN)]

Figure 8:
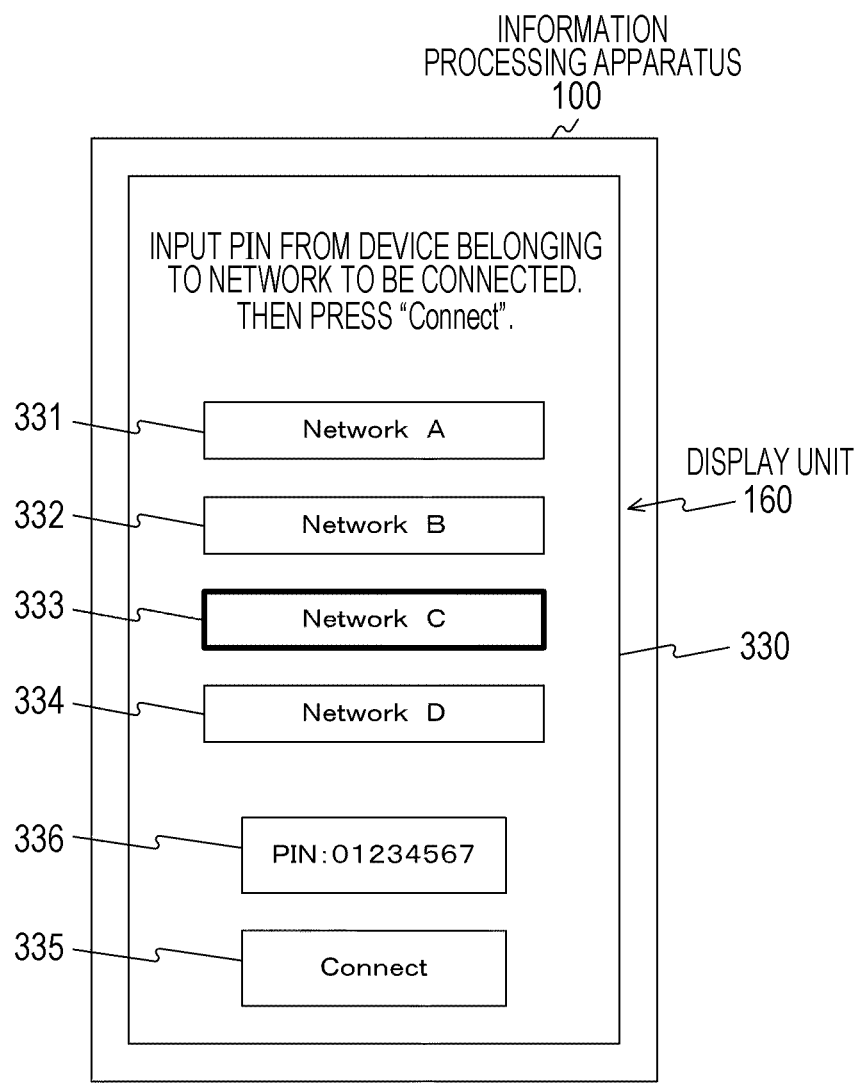
FIG. 8 is a diagram illustrating exemplary display of a display screen displayed on each device configuring the communication system 10 according to the embodiment of the present technology.
Figure 9:
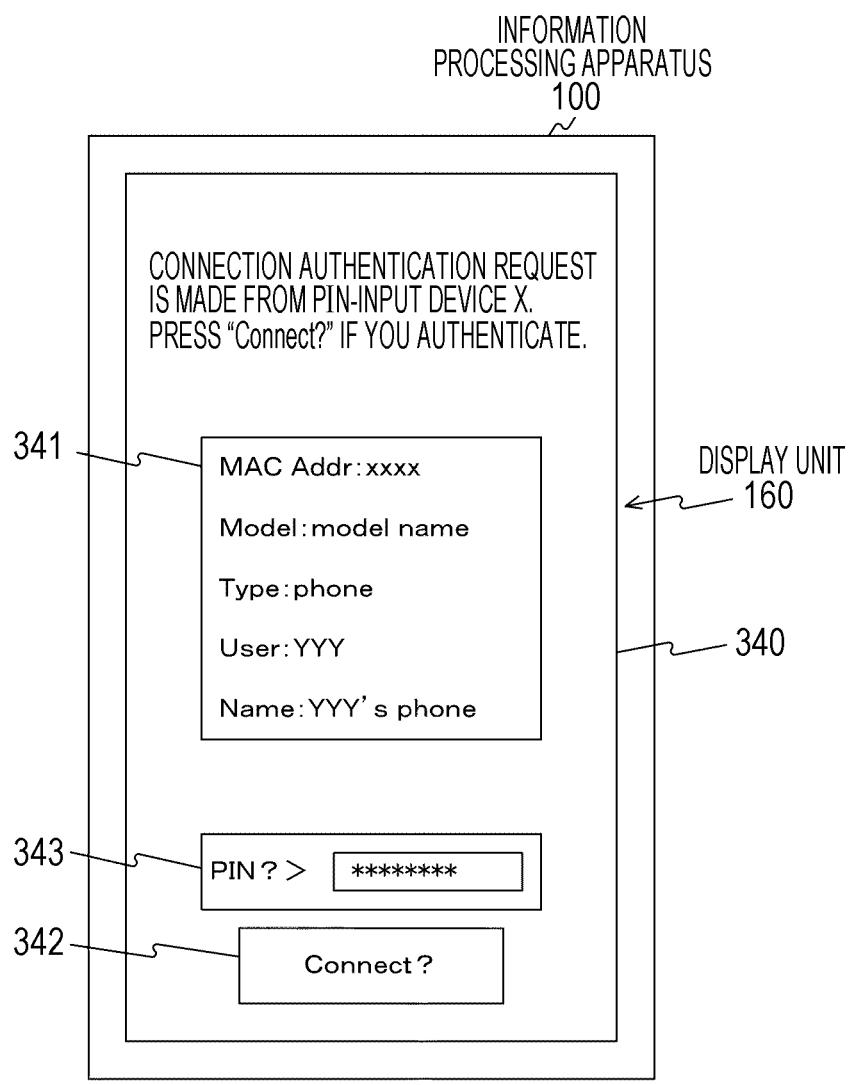
FIG. 9 is a diagram illustrating exemplary display of a display screen displayed on each device configuring the communication system 10 according to the embodiment of the present technology.
Figure 10:
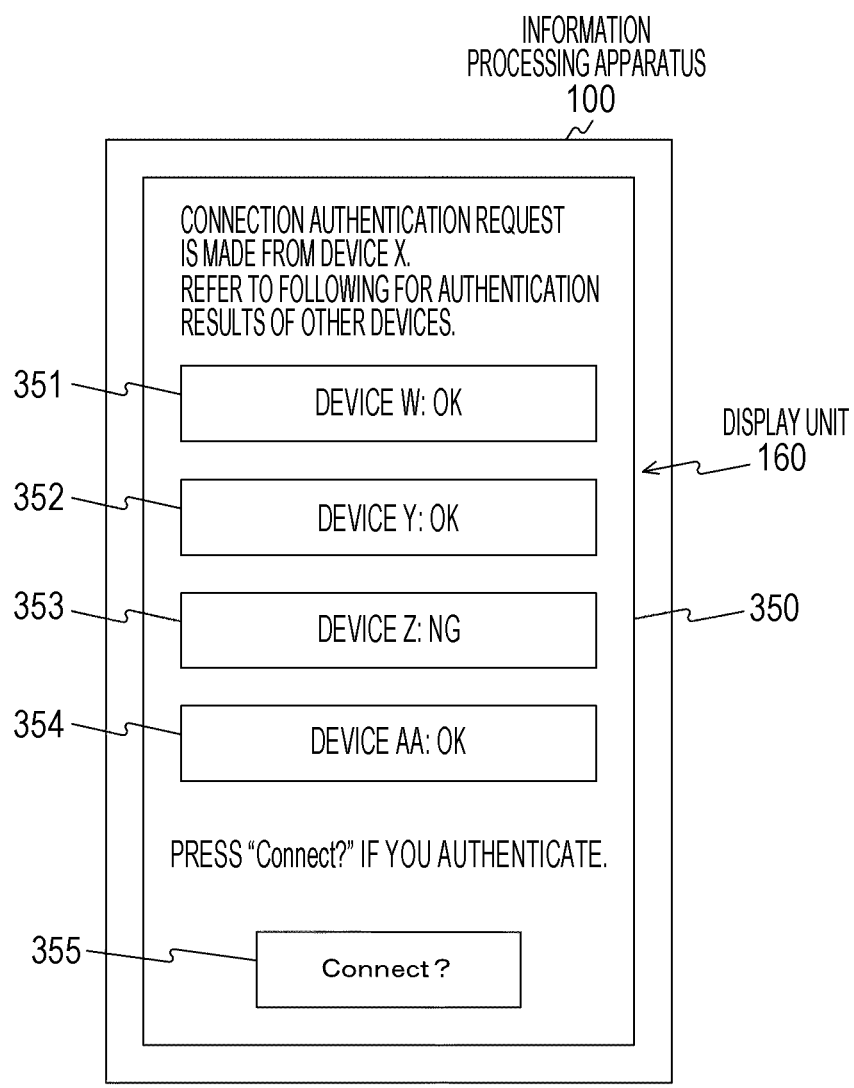
FIG. 10 is a diagram illustrating exemplary display of a display screen displayed on each device configuring the communication system 10 according to the embodiment of the present technology.

FIG. 8 and FIG. 9 are diagrams illustrating exemplary display of display screens displayed on each device configuring the communication system 10 according to the embodiment of the present technology. Additionally, FIG. 8 and FIG. 9 illustrate exemplary display screens displayed on the display unit 160 of the information processing apparatus 100.

A display screen 330 illustrated in FIG. 8 is a variant of the display screen 300 illustrated in FIG. 4. Specifically, the display screen 330 displays a PIN display area 336 in addition to selection buttons 331 to 334 and a connection authentication request button 335. Additionally, the selection buttons 331 to 334 and the connection authentication request button 335 correspond to the selection buttons 301 to 304 and the connection authentication request button 305 illustrated in FIG. 4, respectively.

The PIN display area 336 is directed for displaying a PIN input by a device belonging to a desired network to be connected.

A display screen 340 illustrated in FIG. 9 is a variant of the display screen 320 illustrated in FIG. 6. Specifically, the display screen 340 displays a PIN input area 343 in addition to a device information display area 341 and a connection permission button 342. Additionally, the device information display area 341 and the connection permission button 342 correspond to the device information display area 321 and the connection permission button 322 illustrated in FIG. 6, respectively.

The PIN input area 343 is directed for inputting a PIN displayed in the PIN display area 336 of a new device which wants to connect.

For example, the user who wants to connect to the network C displays the PIN display area 336 (illustrated in FIG. 8) on the display unit of his/her own device (new device), and displays the PIN input area 343 (illustrated in FIG. 9) on the display unit of a device belonging to the network C. The user then inputs the PIN displayed in the PIN display area 336 (illustrated in FIG. 8) of the new device in the PIN input area 343 of the device belonging to the network C.

The PIN-input device (device belonging to the network C) can notify the device (new device) whose PIN is displayed of the network C for which the connection authentication request is to be made. For example, the PIN-input device (device belonging to the network C) can provide the notification to the device (new device) whose PIN is displayed with the information superimposed on a beacon or the like.

For example, even in a case where the user cannot specify a network, he/she can provide notification of the device and the network which he/she wants to connect by use of the PIN.

Additionally, FIG. 8 and FIG. 9 illustrate the examples in which notification of desired device and network to be connected are provided by PIN input, but notification of the desired device and network to be connected can be provided in other method. For example, predetermined buttons are displayed for a desired device (new device) to be connected, and one or more devices belonging to the desired network C to be connected. Then, the operation of pressing the predetermined buttons within a predetermined period of time is performed in each device, thereby providing the above notification.

Herein, as described above, in a case where the operation of starting the connection authentication request is performed by use of the PIN or predetermined buttons, the device in the network which performs the operation may be considered as giving connection authentication permission to the new device at the same time with the operation. Further, not being considered as such, the device in the network which performs the operation may determine whether to give connection authentication permission on the basis of the information included in the connection authentication request. Further, there may be assumed a system in which in a case where a plurality of devices belonging to the network perform the start operation, a device on which the start operation is performed can determine the connection authentication permission/refusal.

In this way, the control unit 140 of the information processing apparatus 100 can permit the new device to connect to the network in a case where the identification information (such as code information (such as PN)) output (displayed, for example) from the new device is received in the operation reception unit 130.

Additionally, it may be assumed that two or more new devices are present at the same time in a case where the operation of starting the connection authentication request is performed by use of the PIN or the predetermined buttons. In this case, the new devices cannot be discriminated in the network. Thus, in this case, there may be assumed a system in which connection with any new device is refused, for example.

In this way, the UI of each device may be assumed as a UI configured to simply display buttons in order to provide notification and to give connection authentication permission/refusal. Further, the UI may be assumed to input a PIN provided in a new device.

Further, in a case where a device belonging to the network responds to the authentication request, a UI configured to show the authentication situations of other devices belonging to the network can be provided to the user. This exemplary display is illustrated in FIG. 10.

[Exemplary Display in Providing Notification Authentication Situation of other Device Belonging to Network]

FIG. 10 is a diagram illustrating exemplary display of a display screen displayed on each device configuring the communication system 10 according to the embodiment of the present technology. Additionally, FIG. 10 illustrates an exemplary display screen displayed on the display unit 160 of the information processing apparatus 100.

A display screen 350 illustrated in FIG. 10 is a variant of the display screen 320 illustrated in FIG. 6. Specifically, the display screen 350 displays authentication situation notification areas 351 to 354 and a connection permission button 355. Additionally, the connection permission button 355 corresponds to the connection permission button 322 illustrated in FIG. 6.

The authentication situation notification areas 351 to 354 are directed for displaying whether to permit the connection authentication (authentication situation) of each device together with a list of devices belonging to a network.

For example, each device belonging to a network can notify other device of the authentication situation of the device by broadcasting the response to the authentication request.

Additionally, as illustrated in FIG. 10, the authentication situation may be displayed in other display form other than a list of devices belonging to a network. For example, a UI capable of visualizing a rate of connection authentication permission/refusal in a graph or the like can be provided. Further, the contents thereof may be output in speech.

In this way, in a case where the control unit 140 of the information processing apparatus 100 receives the connection authentication request, it can transmit the response to the connection authentication request to other device, and can notify (such as display or output in speech) the user of the contents of the response of other device.

[Exemplary Operations of Information Processing Apparatus making Connection Authentication Request]

Figure 11:
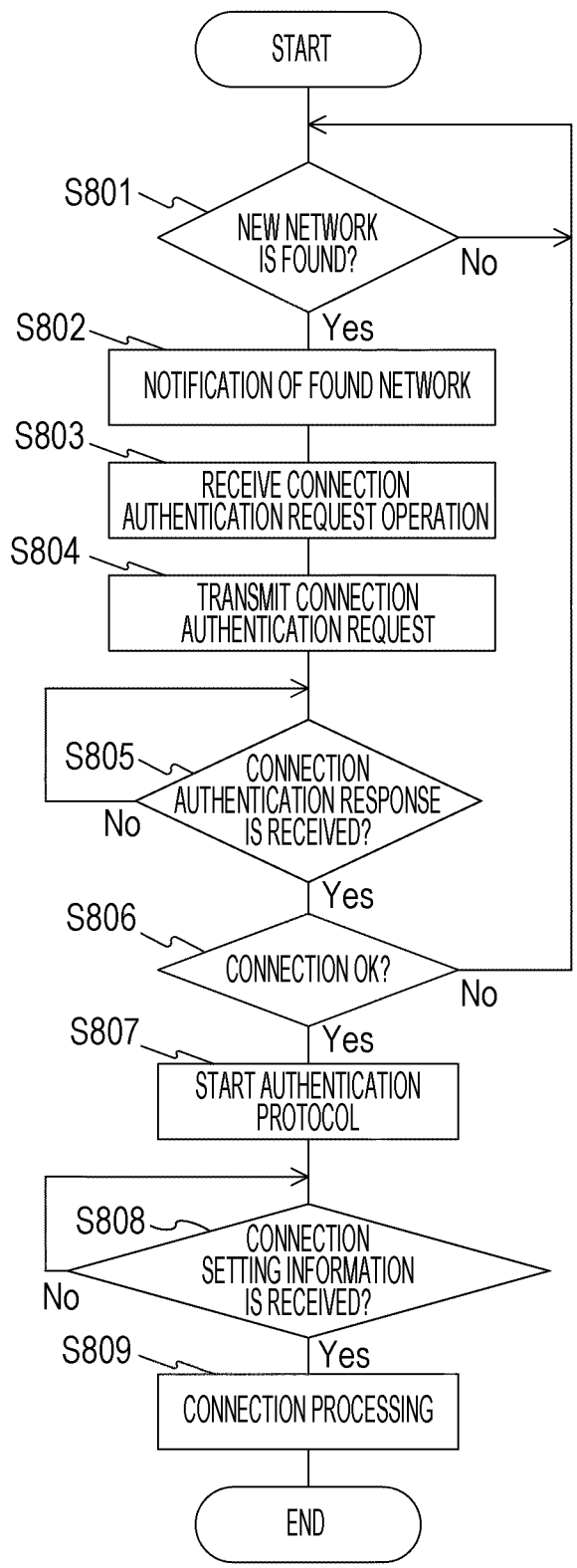
FIG. 11 is a flowchart illustrating an exemplary processing procedure of a network connection processing by the information processing apparatus 100 according to the embodiment of the present technology.

FIG. 11 is a flowchart illustrating an exemplary processing procedure of the network connection processing by the information processing apparatus 100 according to the embodiment of the present technology. FIG. 11 illustrates that the information processing apparatus 100 makes the connection authentication request to a device belonging to the network by way of example.

At first, the control unit 140 of the information processing apparatus 100 scans around the information processing apparatus 100, and determines whether it has found a new network (step S801). In a case where it has not found a new network (step S801), it performs the scanning again.

In a case where the control unit 140 has found a new network (step S801), it notifies the user of the found network (step S802). The control unit 140 displays a list of found networks on the display unit 160 as illustrated in FIG. 4, for example.

Subsequently, the user confirms such notification contents, and determines whether to make the connection authentication request to a found network. Then, in a case where the user makes the connection authentication request to a found network, he/she performs the operation of making the connection authentication request (step S803).

Subsequently, the control unit 140 transmits the connection authentication request to at least one device among the devices belonging to the network for which the connection authentication request is made (step S804).

Subsequently, the control unit 140 determines whether it has received the connection authentication response (step S805). In a case where the control unit 140 has not received the connection authentication response (step S805), it continuously performs the monitoring.

In a case where the control unit 140 has received the connection authentication response (step S805), it starts the authentication protocol (step S807). Subsequently, the control unit 140 determines whether it has received the connection setting information from a device belonging to the network for which it made the connection authentication request (step S808). In a case where the control unit 140 has not received the connection setting information (step S808), it continuously performs the monitoring.

In a case where the control unit 140 has received the connection setting information (step S808), it performs the processing of connecting to the network by use of the received connection setting information (step S809).

In this way, the control unit 140 can notify the user of the information associated with a plurality of devices or the network, and can perform control to transmit the connection authentication request to at least one of a plurality of devices configuring the network selected on the basis of the user selection operation.

Further, the control unit 140 can perform the connection processing of connecting to the network on the basis of the connection setting information transmitted when connection is permitted in response to the connection authentication request on the basis of the responses (connection authentication responses) to the connection authentication request from the plurality of devices.

[Exemplary Operations of Information Processing Apparatus belonging to Network]

Figure 12:
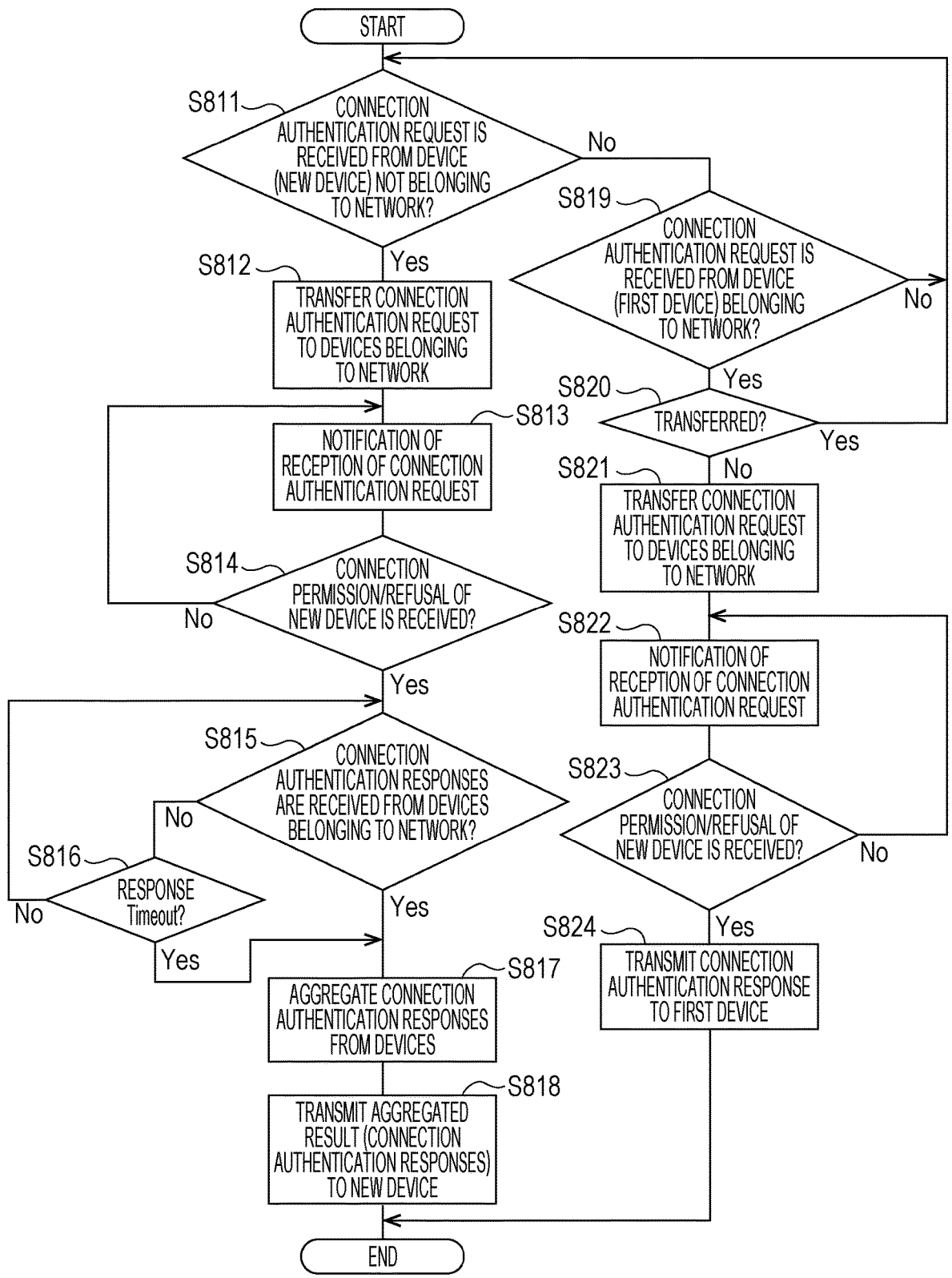
FIG. 12 is a flowchart illustrating an exemplary processing procedure of a new device connection determination processing by the information processing apparatus 100 according to the embodiment of the present technology.

FIG. 12 is a flowchart illustrating an exemplary processing procedure of the new device connection determination processing by the information processing apparatus 100 according to the embodiment of the present technology. FIG. 12 illustrates that the information processing apparatus 100 determines whether to give connection permission to a device which makes the connection authentication request by way of example.

At first, the control unit 140 of the information processing apparatus 100 determines whether it has received the connection authentication request from a device not belonging to the network of the information processing apparatus 100 (step S811).

In a case where the control unit 140 has received the connection authentication request from a device not belonging to the network of the information processing apparatus 100 (step S811), it transfers the connection authentication request to each device belonging to the network of the information processing apparatus 100 in Broadcast (step S812).

Subsequently, the control unit 140 notifies the user of the reception of the connection authentication request (step S813). For example, the control unit 140 displays the display screen 320 indicating that the connection authentication request is made on the display unit 160 as illustrated in FIG. 6. The user who is notified of the reception of the connection authentication request inputs whether to respond by the operation reception unit 130. The control unit 140 then determines whether the new device connection permission/refusal has been received (step S814). In a case where the new device connection permission/refusal has not been received (step S814), the processing returns to step S813, where the notification is continuously provided to the user.

In a case where the new device connection permission/refusal has been received (step S814), the control unit 140 determines whether it has received the connection authentication request from each device belonging to the network of the information processing apparatus 100 (step S815). In a case where the control unit 140 has not received the connection authentication request from all the devices belonging to the network of the information processing apparatus 100 (step S815), it determines whether a certain period of time has elapsed after the transfer of the connection authentication request (step S816). In a case where the certain period of time has not elapsed (step S816), the processing returns to step S815. On the other hand, in a case where the certain period of time has elapsed (step S816), the processing proceeds to step S817.

In a case where the control unit 140 has received the connection authentication request from all the devices belonging to the network (step S815), it determines whether to permit the new device to connect on the basis of the connection authentication response received from each device and the determined contents of the information processing apparatus 100 (the connection authentication response) (step S817).

Subsequently, the control unit 140 transmits the determined contents (aggregate result) as the connection authentication response to the new device (step S818).

Further, in a case where the control unit 140 has not received the connection authentication request from a device not belonging to the network of the information processing apparatus 100 (step S811), it determines whether it has received the connection authentication request from a device (first device) belonging to the network of the information processing apparatus 100 (step S819). In a case where the connection authentication request has not been received from the first device (step S819), the processing returns to step S811.

In a case where the control unit 140 has received the connection authentication request from the first device (step S819), it determines whether it has already transferred the connection authentication request (step S820). In a case where the connection authentication request has been already transferred (step S820), the processing returns to step S811.

In a case where the control unit 140 has not transferred the connection authentication request (step S820), it transfers the connection authentication request to each device belonging to the network of the information processing apparatus 100 in Broadcast (step S821).

Subsequently, the control unit 140 notifies the user of the reception of the connection authentication request (step S822). The user who is notified of the reception of the connection authentication request inputs whether to respond by the operation reception unit 130. The control unit 140 then determines whether the new device connection permission/refusal has been received (step S823). In a case where the new device connection permission/refusal has not been received (step S823), the processing returns to step S822, where the notification is continuously provided to the user.

In a case where the new device connection permission/refusal has been received (step S823), the control unit 140 transmits the received new device connection permission/refusal as the connection authentication response to the first device (step S824).

In this way, in a case where the control unit 140 has received the connection authentication request, it performs control to transfer the connection authentication request to a plurality of devices. Further, the control unit 140 can permit the new device to connect to the network on the basis of the responses (connection authentication responses) to the connection authentication request from the plurality of devices.

Further, in a case where the control unit 140 has received the connection authentication request, it notifies the user of the reception of the connection authentication request, and can make the connection authentication response on the basis of the user' approval operation (such as button pressing operation) in response to the connection authentication request.

[Exemplary Setting of Authority to give Authentication Permission]

There has been described above the example in which each information processing apparatus belonging to the network has the authority to give authentication permission. Herein, the authority to give authentication permission may be given to only some of the information processing apparatuses belonging to the network as described above. Thus, exemplary setting of the authority to give authentication permission will be described below.

For example, the authority to give authentication permission can be given to the information processing apparatus which first establishes the network. Further, the information processing apparatus which first establishes the network may give all or part of the authority to give authentication permission to one or more other information processing apparatuses belonging to the network.

Further, for example, only one or more information processing apparatuses (information processing apparatuses belonging to the network) determined in any policy may have the authority to give authentication permission. For example, the information processing apparatuses having the authority to give authentication permission may be determined on the basis of the characteristics (presence of user interface (UI) or presence of any function) of the information processing apparatuses.

Further, for example, the information processing apparatuses having the authority to give authentication permission may be limited to the information processing apparatuses present in a coverage in which they can receive a signal output by the information processing apparatus (new device) making the connection authentication request to the network. Further, the information processing apparatuses having the authority to give authentication permission may be determined in the order of connection to the network.

For example, in a case where only one of the plurality of information processing apparatuses belonging to the network has the authority to give authentication permission, the information processing apparatus having the authority to give authentication permission may leave the network. In this way, in a case where the information processing apparatus having the authority to give authentication permission leaves the network, the information processing apparatus may assign all of the authority (authority to give authentication permission) to other information processing apparatuses at any timing (such as immediately before leaving). In this case, the information processing apparatus having the authority to give authentication permission may assign the authority to give authentication permission to a plurality of information processing apparatuses.

In this way, in a case where the authority to give authentication permission is given to a plurality of information processing apparatuses, a different authority to give authentication permission may be given to each information processing apparatus. For example, the authorities to give authentication permission classified at a plurality of priorities may be given to the information processing apparatuses.

Further, for example, in a case where the authorities to give authentication permission with different priorities are given to a plurality of information processing apparatuses in the order based on a predetermined rule, the authorities to give authentication permission may be given in the descending order of priority.

For example, the control unit 140 of the information processing apparatus 100 can set a priority to the authority to give authentication permission, and can give connection permission on the basis of a response from a device having the authority to give connection permission set with the priority meeting a predetermined standard.

Further, for example, the information processing apparatus having the authority to give authentication permission may assign its own authority to give authentication permission to other information processing apparatuses in a user operation or automatically. In this case, the information processing apparatus assigned with the authority to give authentication permission from a plurality of information processing apparatuses may have the authorities to give authentication permission of the plurality of information processing apparatuses, or may have its own authority. Further, the information processing apparatus assigning the authority to give authentication permission may assign the authority to give authentication permission to only one information processing apparatus, or may assign the authority to give authentication permission to a plurality of information processing apparatuses in a divided manner. The rules may be set by a user operation, or may be automatically set.

Herein, the information processing apparatus which assigns the authority to give authentication permission transmits the assignment of the authority to give authentication permission to the assignee in unicast. In this case, the information processing apparatus which assigns the authority to give authentication permission may transmit a request to assign the authority to give authentication permission in advance. Further, the information processing apparatus which assigns the authority to give authentication permission may select an assignee and transmits the assignment request to it at the assignment timing. Further, the information processing apparatus which assigns the authority to give authentication permission may provide notification of the assignment of the authority to give authentication permission at the assignment timing or in advance in broadcast, and may select an assignee from among the information processing apparatuses which respond to the notification.

[Exemplary Operations of Information Processing Apparatus Assigning Authority to give Authentication Permission]

Figure 13:
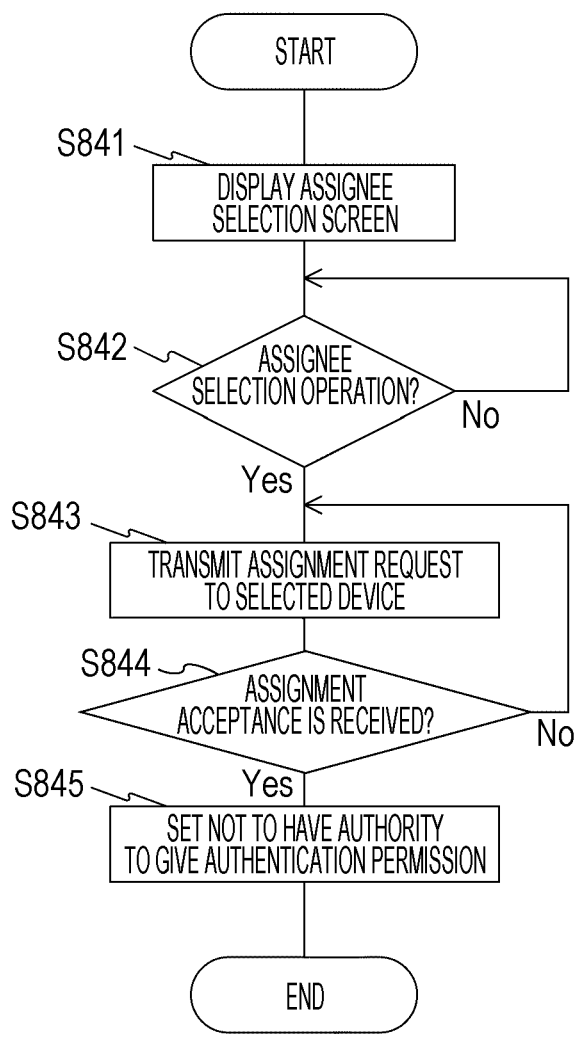
FIG. 13 is a flowchart illustrating an exemplary processing procedure of an authentication permission authority assignment processing by the information processing apparatus 100 according to the embodiment of the present technology.

FIG. 13 is a flowchart illustrating an exemplary processing procedure of the processing of assigning the authority to give authentication permission by the information processing apparatus 100 according to the embodiment of the present technology. FIG. 13 illustrates that the information processing apparatus 100 assigns its own authority to give authentication permission to other information processing apparatus by way of example.

At first, the control unit 140 of the information processing apparatus 100 displays an assignee selection screen (screen of a list of devices) for selecting an assignee from among the devices belonging to the network on the display unit 160 (step S841). Subsequently, the control unit 140 determines whether the selection operation (user operation) of selecting an assignee to which the authority to give authentication permission is assigned has been performed on the assignee selection screen (step S842). In a case where the selection operation has not been performed (step S842), the control unit 140 continuously performs the monitoring.

In a case where the selection operation has been performed (step S842), the control unit 140 transmits the assignment request to assign the authority to give authentication permission to the device selected in the selection operation (step S843). The assignment request includes the information associated with the authority to give authentication permission to be assigned. The information can include the priority of the authority to give authentication permission, and the like, for example.

Subsequently, the control unit 140 determines whether it has received the assignment acceptance from the device to which it transmitted the assignment request (step S844). In a case where the control unit 140 has not received the assignment acceptance (step S844), the processing returns to step S843. Additionally, in a case where the control unit 140 has received the information indicating that the assignment is not accepted from the device to which it transmitted the assignment request, it displays the information on the display unit 160, and promotes selection of other device.

In a case where the control unit 140 has received the assignment acceptance (step S844), it sets not to have the authority to give authentication permission (step S845).

[Exemplary Operations of Information Processing Apparatus Assigned with Authority to give Authentication Permission]

Figure 14:
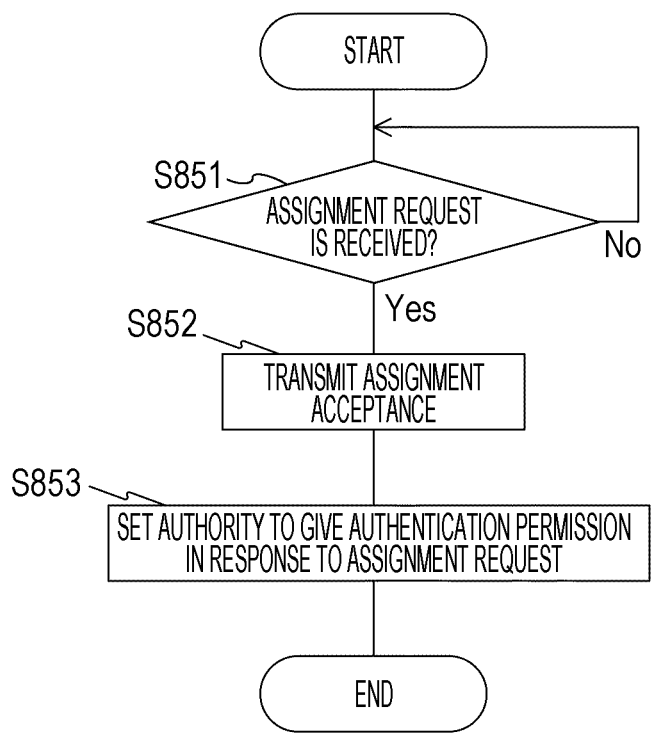
FIG. 14 is a flowchart illustrating an exemplary processing procedure of the authentication permission authority assignment processing by the information processing apparatus 100 according to the embodiment of the present technology.

FIG. 14 is a flowchart illustrating an exemplary processing procedure of the processing of assigning the authority to give authentication permission by the information processing apparatus 100 according to the embodiment of the present technology. FIG. 14 illustrates that the information processing apparatus 100 is assigned with the authority to give authentication permission by other information processing apparatus by way of example.

At first, the control unit 140 of the information processing apparatus 100 determines whether it has received the assignment request from each device belonging to the network (step S851). In a case where the control unit 140 has not received the assignment request (step S851), it continuously performs the monitoring.

In a case where the control unit 140 has received the assignment request (step S851), it transmits the assignment acceptance for the received assignment request to the device which transmitted the assignment request (step S852). Herein, in a case where the control unit 140 has received the assignment request, it may transmit the assignment acceptance assuming that it notifies the user of the reception of the assignment request and the user performs the approval operation.

Subsequently, the control unit 140 performs control to set the authority to give authentication permission in response to the received assignment request (step S853). For example, the authority to give authentication permission is set on the basis of the contents included in the received assignment request.

[Exemplary Information Processing Apparatus Exchanging Connection Setting Information]

There has been described above that a device (device belonging to the network) which first receives the connection authentication request from a device (new device) which makes the connection authentication request is a device (first device) which exchanges the connection setting information with the new device by way of example. In this case, the device which exchanges the connection setting information may notify other devices (such as new device and surrounding device) that it is a party device with which the new device exchanges the connection setting information. In this case, the device which exchanges the connection setting information can transmit the fact on a beacon or the like.

Herein, it is assumed that the new device or the device which exchanges the connection setting information moves so that any device goes outside the communicable range of other device. In a case where any device moves outside the communicable range in this way, the device which exchanges the connection setting information may assign its role to other device.

For example, in a case where the new device leaves the communicable range after the connection setting information exchanging protocol is started, the new device may retry the connection setting information exchanging protocol from the beginning with the device to which the role is newly assigned. Further, for example, the device which exchanges the connection setting information may notify the device to which the role is to be newly assigned of the result of the ongoing connection setting information exchanging protocol. Further, for example, other device (device belonging to the network) newly entering the communicable range relays the data so that the device which exchanges the connection setting information may continue the processing of the connection setting information exchanging protocol.

Further, for example, it is also assumed that the new device goes outside the communicable range while the connection setting information is being exchanged. In this case, the device which exchanges the connection setting information may notify the surroundings of the fact on a beacon or the like, and may search for an assignee of the role. Then, in a case where an assignee is determined, the assignee device may provide notification of the information indicating the assignment of the role on a beacon or the like.

Further, for example, in a case where the device exchanging the connection setting information goes outside the communicable range, the new device may retransmit a message of asking to start the connection setting information exchanging protocol to other device present in other communicable range. In this case, other message indicating the interruption may be transmitted. Further, for example, notification of the same session may be provided by use of the same unique ID or the like as the first-transmitted start request.

Further, for example, a device which first receives the message of requesting to restart/assign the protocol sequence from both the new device and the device exchanging the connection setting information may set to be assigned with the role of exchanging the connection setting information.

[Example of Automatically Making Connection Authentication Request on the Basis of Capability]

Automatic exchange of the connection authentication request based on Capability will be described herein by way of example.

For example, a device A1 is assumed as a device (or device not including the Internet connection function) which can share the GPS information but may need Internet connection. A device B1 capable of Internet connection is assumed to belong to a network N1.

In this case, for example, the device A1 scans and finds the unconnected network N1, and receives the Capability information of the network N1. The device A1 can grasp that the device B1 capable of Internet connection belongs to the network N1 with reference to the Capability information of the network N1.

Thus, the device A1 transmits the connection authentication request to the device B1 belonging to the network N1. The device B1 transfers the connection authentication request to each device belonging to the network.

Herein, in a case where a device C1 belonging to the network N1 needs the GPS information, the device C1 confirms Capability of the new device (device A1) included in the connection authentication request, and can grasp that it can obtain the GPS information. In this case, the device C1 automatically returns the connection authentication response of OK.

Further, the device B1 receives the connection authentication response of OK from the device C1, and transmits the response of OK to the device A1. Subsequently, the device B1 starts the connection setting information exchanging protocol with the device A1. In this way, each device can obtain its necessary function from the network.

Further, for example, it is assumed that even in a case where the device A1 does not particularly need a function, other device belonging to the network N1 needs the GPS function. In such a case, the device A1 can automatically transmit the connection authentication request and connect to the network N1, and can automatically expand the function of the network N1 on the basis of Capability indicating that the network N1 needs the GPS function.

The automatic connection is made in this way so that a sensor network capable of obtaining necessary information can be automatically constructed as needed for a single-function sensor arranged at each place, for example. The sensor is a GPS sensor capable of obtaining positional information, a gyro sensor capable of detecting a direction, an orientation sensor capable of detecting an orientation, or an obstacle sensor configured to avoid a collision (sensor configured to detect an obstacle and to avoid the obstacle), for example. Further, the sensor is a pH measurement sensor capable of measuring potential hydrogen or power of hydrogen (pH), a temperature measurement sensor, a rain measurement sensor, a sunlight sensor, an image sensor, or an acceleration sensor, for example. Further, for example, in a case where the user wants to output the information of his/her device not having the output function from other output apparatus (display unit or speech output unit), he/she connects with an available device over the network, and can use its function.

Herein, for example, a device including the Internet connection function required by the device A1 is assumed as a device D1 (device belonging to the network N1). In this case, in a case where other device belonging to the network N1 receives the connection authentication request from the device A1, it is possible to grasp that the function required by the device A1 is Internet connection on the basis of Capability. In this case, any device belonging to the network N1 may set the authority to give authentication permission at only the device D1 among the devices belonging to the network N1. Alternatively, the authority to give authentication permission with a high priority may be set only for the device D1. Alternatively, the authority to refuse connection may be set only for the device D1. In this way, a device including Capability required by the device A1 may be assigned with the authority to permit/refuse connection.

[Exemplary Operations in Automatically making Connection Authentication Request on the Basis of Capability]

Figure 15:
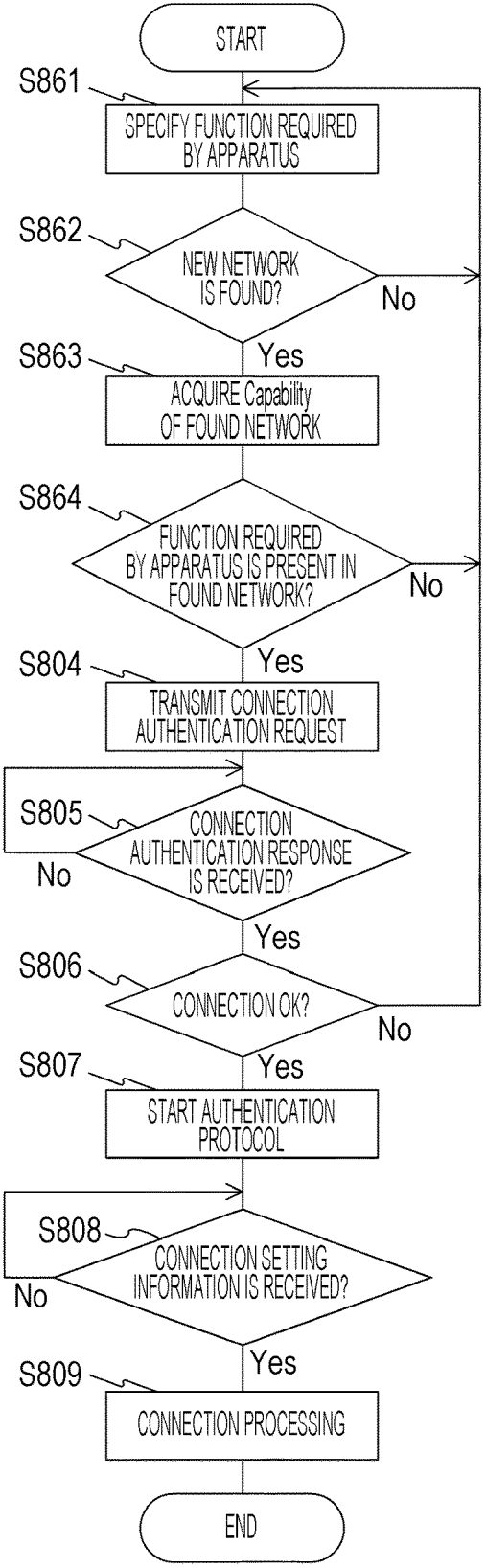
FIG. 15 is a flowchart illustrating an exemplary processing procedure of the network connection processing by the information processing apparatus 100 according to the embodiment of the present technology.

FIG. 15 is a flowchart illustrating an exemplary processing procedure of the network connection processing by the information processing apparatus 100 according to the embodiment of the present technology. FIG. 15 illustrates that the information processing apparatus 100 automatically makes the connection authentication request on the basis of Capability by way of example. Additionally, FIG. 15 is a variant of FIG. 11, and thus the common parts with FIG. 11 are denoted with the same reference numerals for description.

At first, the control unit 140 of the information processing apparatus 100 specifies a function required by the information processing apparatus 100 (step S861). For example, in a case where an Internet game application using positional information is activated in the information processing apparatus 100, the Internet connection function and the GPS function are specified as necessary functions.

Subsequently, the control unit 140 scans around he information processing apparatus 100, and determines whether it has found a new network (step S862). In a case where the control unit 140 has not found a new network (step S862), the processing returns to step S861.

In a case where the control unit 140 has found a new network (step S862), it acquires Capability of each device belonging to the found network (step S863). For example, the devices belonging to the network can transmit Capability of each device belonging to the network on a beacon. In a case where the control unit 140 receives the beacon, it can acquire Capability of each device belonging to the network.

Subsequently, the control unit 140 determines whether a device including the functions required by the information processing apparatus 100 is present among the devices belonging to the found network (step S864). In a case where a device including the functions required by the information processing apparatus 100 is present among the devices belonging to the found network (step S864), the control unit 140 transmits the connection authentication request to at least one device among the devices belonging to the network (step S804). In a case where a device including the functions required by the information processing apparatus 100 is not present among the devices belonging to the found network (step S864), the processing returns to step S861.

In this way, the control unit 140 can perform control to transmit the connection authentication request to at least one of the plurality of devices configuring the network selected on the basis of Capability of the plurality of devices.

[Exemplary Operations in Automatically Making Connection Authentication Response on the Basis of Capability]

Figure 16:
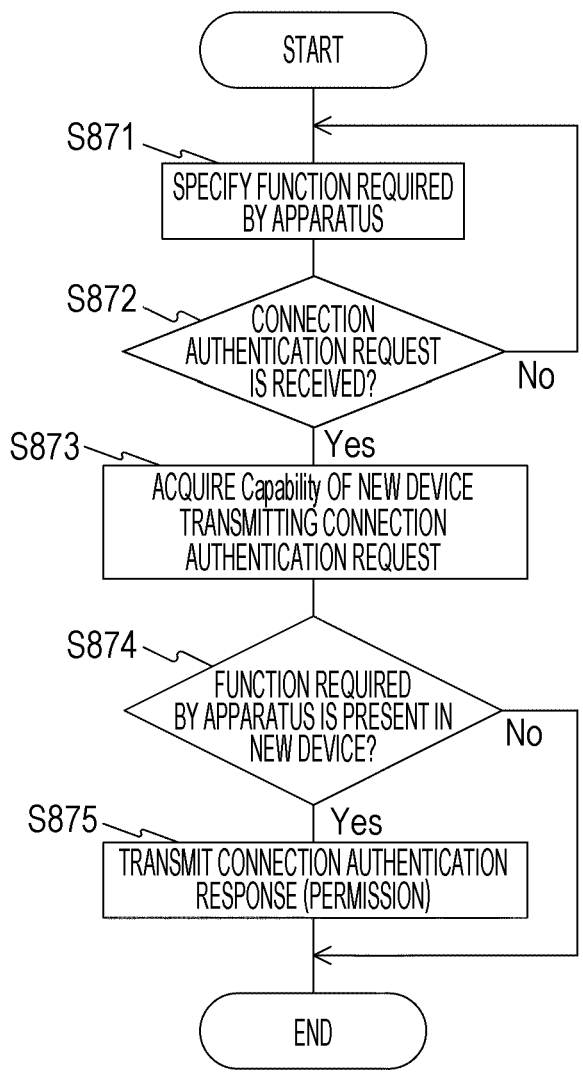
FIG. 16 is a flowchart illustrating an exemplary processing procedure of the new device connection determination processing by the information processing apparatus 100 according to the embodiment of the present technology.

FIG. 16 is a flowchart illustrating an exemplary processing procedure of the new device connection determination processing by the information processing apparatus 100 according to the embodiment of the present technology. FIG. 16 illustrates that the information processing apparatus 100 automatically makes the connection authentication response on the basis of Capability by way of example. Additionally, FIG. 16 is a variant of FIG. 12, and thus only the parts corresponding to some parts of FIG. 12 will be described.

At first, the control unit 140 of the information processing apparatus 100 specifies a function required by the information processing apparatus 100 (step S871).

Subsequently, the control unit 140 determines whether it has received the connection authentication request from a device (new device) not belonging to the network of the information processing apparatus 100 or a device (transfer source device) belonging to the network of the information processing apparatus 100 (step S872). In a case where the control unit 140 has not received the connection authentication request (step S872), the processing returns to step S871.

In a case where the control unit 140 has received the connection authentication request (step S872), it acquires Capability of the new device which transmitted the connection authentication request (device not belonging to the network of the information processing apparatus 100) (step S873). For example, the new device can transmit its own Capability in the connection authentication request. In a case where the control unit 140 has received the connection authentication request, it can acquire Capability of the new device.

Subsequently, the control unit 140 determines whether the function required by the information processing apparatus 100 is present among the functions provided in the new device (step S874). In a case where the function required by the information processing apparatus 100 is present among the functions provided in the new device (step S874), the control unit 140 transmits the new device's connection permission as the connection authentication response to the new device or the transfer source device (step S875). In a case where the function required by the information processing apparatus 100 is not present among the functions provided in the new device (step S874), the operation of the new device connection determination processing is terminated.

In this way, in a case where the control unit 140 has received the connection authentication request, it can respond to the connection authentication request on the basis of Capability of the new device.

[Exemplary Construction of New Network]

There has been described above the example in which a new device makes the connection authentication request to an existing network. Herein, when a new network is established, which information processing apparatus mainly generates the connection setting information (security setting information) is important. Thus, there will be described below an example in which the embodiment of the present technology is applied in a case where a plurality of devices construct a new network.

Herein, in a case where a new network is constructed without participating in an existing network, it is necessary that the connection setting information is generated in any method and the connection setting information is distributed to the devices generating a network thereby to construct the network.

For example, in a case where a new network is constructed by two or more devices, at first notification of the presence of the devices is mutually provided by use of a beacon, Action Frame, or the like. In this case, the beacon may mount Special IE indicating the construction of the new network thereon. Further, special Action Frame maybe used.

The two or more devices notify each other of their presence, and then determine which device generates the connection setting information in any policy. For example, at least the MAC address is included in a beacon transmitted from each device. Thus, a device for generating the connection setting information can be determined on the basis of the MAC address included in a beacon. For example, a device for generating the connection setting information can be determined on the basis of the MAC address of each device and any rule (such as magnitude of a numerical value of a position). In this way, a device for generating the connection setting information can be determined by use of only the information included in a beacon.

Further, for example, a device for generating the connection setting information can be determined on the basis of the characteristics of the device (such as the remaining amount of a battery connected to a power supply, or presence of connection to Celler network). Further, for example, a device for generating the connection setting information may be determined on the basis of the number of detectable surrounding devices which want to construct a new network. Further, for example, a device for generating the connection setting information maybe determined on the basis of the magnitude of a randomly-generated value. Further, for example, notification of a value indicating how much the connection setting information is desired to generate is provided among the devices, and a device for generating the connection setting information may be determined on the basis of the value. Additionally, the information may be superimposed on a beacon or the like indicating the presence of its device to be exchanged, or the mutual information may be exchanged by use of a frame such as special Action Frame.

A device determined to generate the connection setting information randomly generates the connection setting information or use the already-stored appropriate connection setting information, for example, thereby to construct a mesh network under control of the device.

In this way, in a case where the control unit 140 of the information processing apparatus 100 constructs a network in which a plurality of devices make wireless communication on a one-to-one basis to be mutually connected, it performs control to determine a device for generating the connection setting information from among the plurality of devices. In this case, the control unit 140 of the information processing apparatus 100 can determine a device for generating the connection setting information by use of the information (such as MAC address) included in a signal (such as beacon) providing notification of the presence of the device.

Herein, other devices make the connection authentication request indicated according to the embodiment of the present technology to the device for generating the connection setting information, thereby constructing the network. In this case, the device for generating the connection setting information may confirm the connection authentication for the devices already participating in the network. Further, for example, each device participating in the launch of the new network may be unconditionally given the authority to give authentication permission and may immediately start the connection setting information exchanging protocol.

Additionally, the priority of the authority to give authentication permission given to each device is assumed at 1 for the first device, for example, and as more devices participate in the network, the priority with a value obtained by dividing 1 by the number of devices can be given. That is, the authorities to give authentication permission with the priorities which take 1 for all the devises belonging to the network can be given.

In this way, according to the embodiment of the present technology, security can be easily set in the communication system such as a mesh network in the IEEE 802.11s in which the devices individually connect and totally construct the network. Further, communication can be easily and safely used.

Further, the authority to determine connection permission can be evenly given to each device on the network in which a management device is not present. Further, a device can connect to the network in an easier operation by use of a button or the like than by use of ID/password.

Further, for example, a device which first receives the connection authentication request transfers the connection authentication request to other devices belonging to the network, and receives the responses thereto. Then, the device which first receives the connection authentication request can authenticate the connection authentication request and determine whether to permit connection on the basis of the result of the aggregated responses.

Thereby, the connection authentication request and the connection can be evenly made among the stations in an autonomous-decentralized network without a master station and can be easily made by a device which wants new connection. That is, an appropriate connection authentication method can be realized in an autonomous-decentralized network.

2. Applied Examples

The technology according to the present disclosure is applicable to various products. For example, the information processing apparatuses 100 to 107 may be realized as Smartphone, tablet personal computer (PC), notebook PC, mobile terminal such as portable game terminal or digital camera, TV receiver, printer, fixed terminal such as digital scanner or network storage, or vehicle-mounted terminal such as car navigation apparatus. Further, the information processing apparatuses 100 to 107 may be realized as smart meter, automatic vendor, remote monitoring apparatus, or terminal (also called machine type communication (MTC) terminal) for making machine to machine (M2M) communication such as point of sale (POS) terminal. Furthermore, the information processing apparatuses 100 to 107 may be a wireless communication module mounted on the terminal (such as integrated circuit module configured of one die).

2-1. First Applied Example

Figure 17:
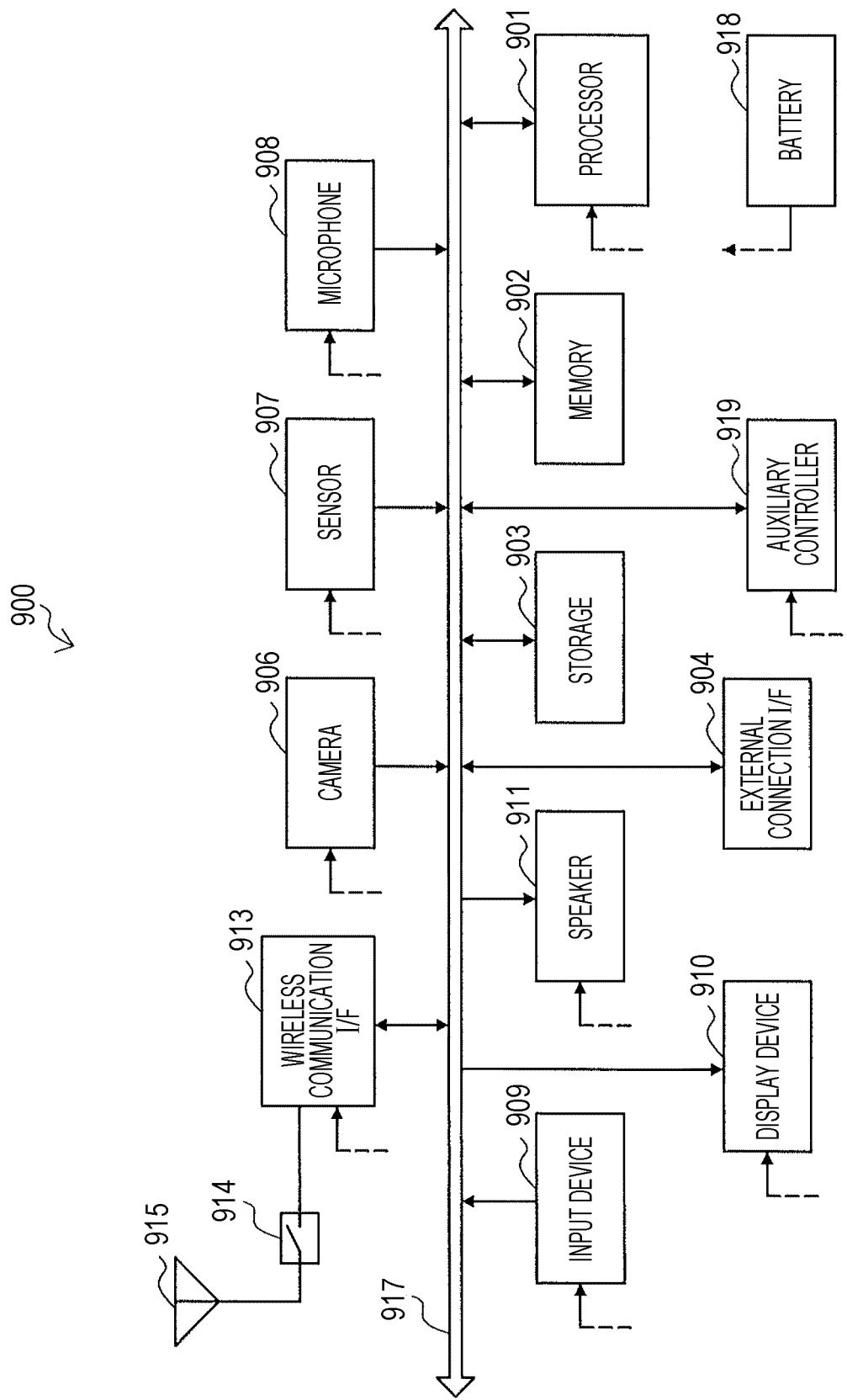
FIG. 17 is a block diagram illustrating an exemplary schematic configuration of a Smartphone.

FIG. 17 is a block diagram illustrating an exemplary schematic configuration of a Smartphone 900 to which the technology according to the present disclosure is applicable. The Smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a central processing unit (CPU) or system on chip (SoC), for example, and controls the functions of an application layer and other layers of the Smartphone 900. The memory 902 includes a random access memory (RAM) and a read only memory (ROM), and stores programs and data executed by the processor 901. The storage 903 may include a storage medium such as semiconductor memory or hard disc. The external connection interface 904 is an interface configured to connect an external device such as memory card or universal serial bus (USB) to the Smartphone 900.

The camera 906 has an imaging device such as charge coupled device (CCD) or complementary metal oxide semiconductor (CMOS), for example, and is directed for generating a shot image. The sensor 907 may include a group of sensors such as position measurement sensor, gyro sensor, geomagnetism sensor, and acceleration sensor. The microphone 908 converts speech input into the Smartphone 900 into a speech signal. The input device 909 includes a touch sensor configured to detect a touch on the screen of the display device 910, a keypad, a keyboard, a button, a switch, or the like, for example, and receives user's operation or information input. The display device 910 has a screen of liquid crystal display (LCD), organic light emitting diode (OLED) display or the like, and displays an output image of the Smartphone 900. The speaker 911 converts a speech signal output from the Smartphone 900 into speech.

The wireless communication interface 913 supports one or more wireless LAN standards such as IEEE 802.11a, 11b, 11g, 11n, 11ac, and 11ad, and makes wireless communication. The wireless communication interface 913 can make communication with other apparatus via a wireless LAN access point in the infrastructure mode. Further, the wireless communication interface 913 can directly make communication with other apparatus in the ad-hoc mode or in the direct communication mode such as Wi-Fi Direct. Additionally, one of two terminals operates as an access point in Wi-Fi Direct unlike in the ad-hoc mode, but communication is directly made between the terminals. The wireless communication interface 913 may typically include a baseband processor, a radio frequency (RF) circuit, a power amplifier, and the like. The wireless communication interface 913 may be a one-chip module integrating a memory configured to store a communication control program, a processor configured to execute the program, and an associated circuit. The wireless communication interface 913 may support other kind of wireless communication system such as near-distance wireless communication system, near wireless communication system, or cellular communication system in addition to the wireless LAN system. The antenna switch 914 switches a connection destination of the antenna 915 among a plurality of circuits (such as circuits in different wireless communication systems) included in the wireless communication interface 913. The antenna 915 has one or a plurality of antenna devices (such as a plurality of antenna devices configuring a MIMO antenna), and is used for transmitting and receiving a wireless signal in the wireless communication interface 913.

Additionally, not limited to the example of FIG. 17, the Smartphone 900 may include a plurality of antennas (such as antenna for wireless LAN and antenna for near wireless communication system). In this case, the antenna switch 914 may be omitted from the components of the Smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block in the Smartphone 900 illustrated in FIG. 17 via power supply lines partially illustrated in broken lines. The auxiliary controller 919 operates the essential functions of the Smartphone 900 in the sleep mode, for example.

In the Smartphone 900 illustrated in FIG. 17, the control unit 140 described in FIG. 2 may be mounted in the wireless communication interface 913. Further, at least some of the functions may be mounted in the processor 901 or the auxiliary controller 919.

Additionally, the processor 901 performs the access point function at the application level so that the Smartphone 900 may operate as a wireless access point (software AP). Further, the wireless communication interface 913 may have the wireless access point function.

2-2. Second Applied Example

Figure 18:
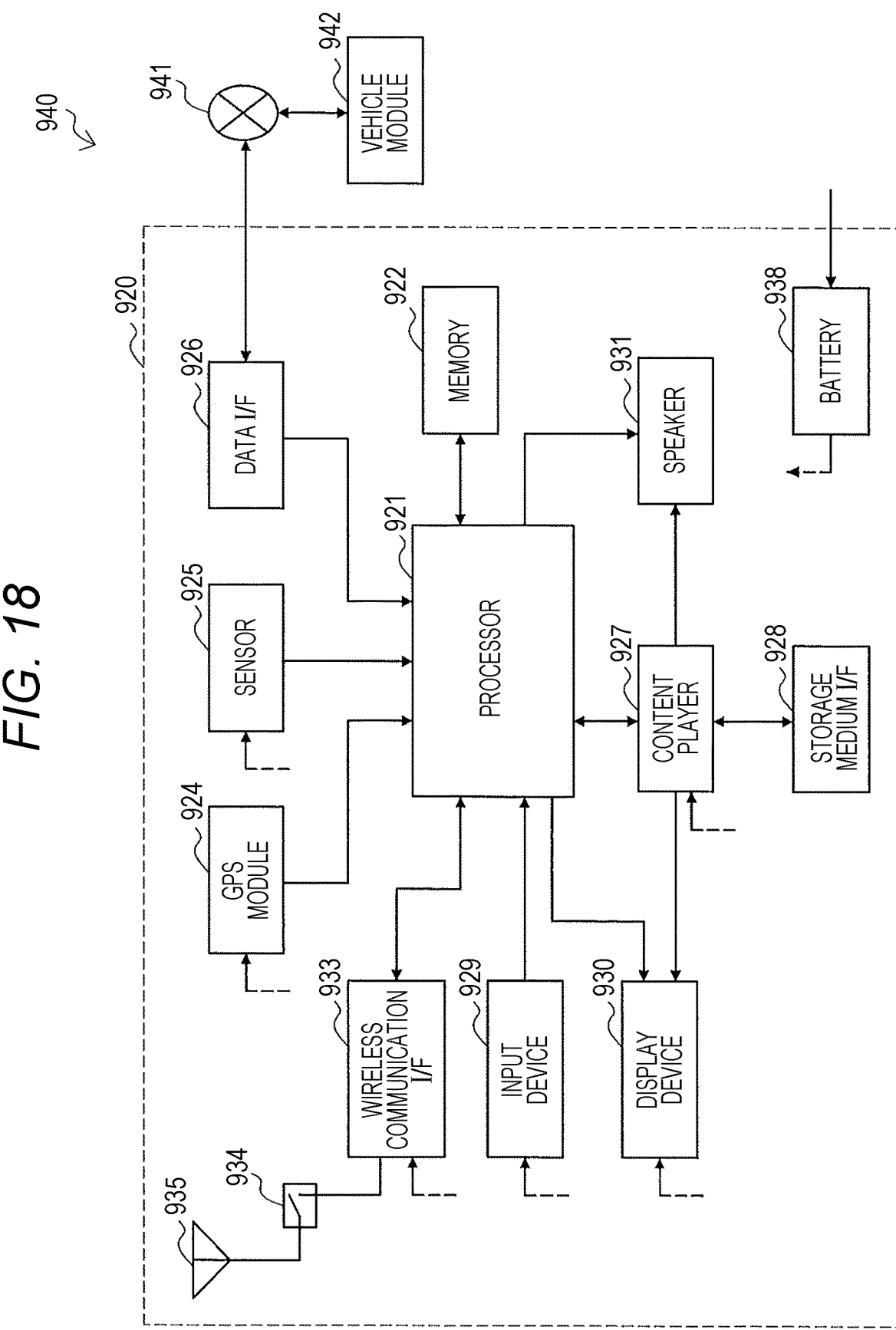
FIG. 18 is a block diagram illustrating an exemplary schematic configuration of a car navigation apparatus.

FIG. 18 is a block diagram illustrating an exemplary schematic configuration of a car navigation apparatus 920 to which the technology according to the present disclosure is applicable. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be a CPU or SoC, for example, and controls the navigation function and other functions of the car navigation apparatus 920. The memory 922 includes a RAM and a ROM, and stores programs and data executed by the processor 921.

The GPS module 924 measures a position (such as latitude, longitude, and altitude) of the car navigation apparatus 920 by use of a GPS signal received from a GPS satellite. The sensor 925 may include a group of sensors such as gyro sensor, geomagnetism sensor, and atmospheric pressure sensor. The data interface 926 is connected to a vehicle-mounted network 941 via a terminal (not illustrated), for example, and acquires data such as vehicle speed data generated in the vehicle.

The content player 927 reproduces the contents stored in a storage medium (such as CD or DVD) inserted into the storage medium interface 928. The input device 929 includes a touch sensor configured to detect a touch on the screen of the display device 930, a button, a switch, or the like, for example, and receives user's operation or information input. The display device 930 has a screen of LCD, OLED display or the like, and displays an image of the navigation function or reproduced contents. The speaker 931 outputs speech of the navigation function or reproduced contents.

The wireless communication interface 933 supports one or more wireless LAN standards such as IEEE 802.11a, 11b, 11g, 11n, 11ac, and 11ad, and makes wireless communication. The wireless communication interface 933 can make communication with other apparatus via a wireless LAN access point in the infrastructure mode. Further, the wireless communication interface 933 can directly make communication with other apparatus in the ad-hoc mode or in the direct communication mode such as Wi-Fi Direct. The wireless communication interface 933 may typically include a baseband processor, a RF circuit, a power amplifier, and the like. The wireless communication interface 933 may be a one-chip module integrating a memory configured to store a communication control program, a processor configured to execute the program, and an associated circuit. The wireless communication interface 933 may support other kind of wireless communication system such as near-distance wireless communication system, near wireless communication system, or cellular communication system in addition to the wireless LAN system. The antenna switch 934 switches a connection destination of the antenna 935 among a plurality of circuits included in the wireless communication interface 933. The antenna 935 has one or a plurality of antenna devices, and is used for transmitting and receiving a wireless signal in the wireless communication interface 933.

Additionally, not limited to the example of FIG. 18, the car navigation apparatus 920 may include a plurality of antennas. In this case, the antenna switch 934 may be omitted from the components of the car navigation apparatus 920.

The battery 938 supplies power to each block of the car navigation apparatus 920 illustrated in FIG. 18 via power supply lines partially illustrated in broken lines. Further, the battery 938 accumulates power supplied from the vehicle.

In the car navigation apparatus 920 illustrated in FIG. 18, the control unit 140 described in FIG. 2 may be mounted in the wireless communication interface 933. Further, at least some of the functions may be mounted in the processor 921.

Further, the wireless communication interface 933 may operate as a communication control apparatus, and may provide wireless communication to a terminal of a user in the vehicle.

Further, the technology according to the present disclosure may be realized as a vehicle-mounted system (or vehicle) 940 including one or more blocks in the car navigation apparatus 920, the vehicle-mounted network 941, and a vehicle module 942. The vehicle module 942 generates vehicle data such as vehicle speed, engine revolution, or failure information, and outputs the generated data to the vehicle-mounted network 941.

Additionally, the above embodiment is exemplary for embodying the present technology, and the items according to the embodiment correspond to the invention-specific items in CLAIMS. Similarly, the invention-specific items in CLAIMS correspond to the items according to the embodiment of the present technology with the same names as the invention-specific items. However, the present technology is not limited to the embodiment, and can be embodied by variously modifying the embodiment without departing from the scope.

Further, the processing procedures described according to the embodiment may be assumed as a method including the procedures, and may be assumed as a program for causing a computer to perform the procedures or a recording medium storing the programs. The recording medium may employ, for example, a compact disc (CD), a minidisc (MD), a digital versatile disc (DVD), a memory card, a Blu-ray (registered trademark) disc, or the like.

Additionally, the effects described in the present specification are merely exemplary, and are not restrictive, and other effects may be obtained.

Additionally, the present technology can take the following configurations.

(1)

An Information Processing Apparatus Including:

a communication unit configured to receive a connection authentication request from a new device other than a plurality of devices configuring a network in which the plurality of devices including the information processing apparatus make wireless communication on a one-to-one basis to be mutually connected; and a control unit configured to transfer the connection authentication request to the plurality of devices in a case of receiving the connection authentication request, and to permit the new device to connect to the network on the basis of the responses to the connection authentication request from the plurality of devices.

(2)

The information processing apparatus according to (1), in which the control unit gives the connection permission on the basis of the major responses from the plurality of devices.

(3)

The information processing apparatus according to (1), in which the control unit gives the connection permission on the basis of the responses from a predetermined number of devices having an authority to give connection permission among the plurality of devices.

(4)

The information processing apparatus according to (3), in which the control unit sets the authority to give connection permission to a predetermined number of devices among the plurality of devices.

(5)

The information processing apparatus according to (4), in which in a case where a device having the authority to give connection permission leaves the network, the control unit performs control to assign the authority to give connection permission from the device which leaves to the devices other than the device which leaves among the plurality of devices.

(6)

The information processing apparatus according to (3), in which the control unit sets a priority of the authority to give connection permission, and gives the connection permission on the basis of the responses from the devices having the authority to give connection permission set with a priority meeting a predetermined standard.

(7)

The information processing apparatus according to any of (1) to (6), in which in a case of receiving the connection authentication request, the plurality of devices notify the user of the reception of the connection authentication request, and make the response on the basis of an approval operation of the user for the connection authentication request.

(8)

The information processing apparatus according to any of (1) to (6), in which in a case of receiving the connection authentication request, the plurality of devices make the response on the basis of Capability of the new device.

(9)

The information processing apparatus according to any of (1) to (8), in which in a case where identification information output from the new device is received in a reception unit, the control unit permits the new device to connect to the network.

(10)

The information processing apparatus according to any of (1) to (9), in which in a case of receiving the connection authentication request, the plurality of devices transmit the responses to the connection authentication request to other devices, and notify the users of the contents of the responses of other devices.

(11)

An Information Processing Apparatus Including:

a communication unit configured to transmit a connection authentication request to a network in which a plurality of devices make wireless communication on a one-to-one basis to be mutually connected to at least one of the plurality of devices; and a control unit configured to perform a connection processing of connecting to the network on the basis of connection setting information transmitted when connection is permitted in response to the connection authentication request on the basis of the responses to the connection authentication request from the plurality of devices.

(12)

The information processing apparatus according to (11), in which the control unit performs control notify the user of the information associated with the plurality of devices or the network, and to transmit the connection authentication request to at least one of a plurality of devices configuring a network selected on the basis of the user selection operation.

(13)

The information processing apparatus according to (11), in which the control unit performs control to transmit the connection authentication request to at least one of a plurality of devices configuring a network selected on the basis of Capability of the plurality of devices.

(14)

An Information Processing Apparatus Including:

a control unit configured to perform control to determine a device which generates connection setting information in order to perform a connection processing among a plurality of devices from among the plurality of devices performs control constructing a network in which the plurality of devices including the information processing apparatus make wireless communication on a one-to-one basis to be mutually connected.

(15)

The information processing apparatus according to (14), in which the control unit determines the device which generates connection setting information by use of information included in a signal providing notification of the presence of the device.

(16)

An information processing method including a control procedure of, performs control receiving a connection authentication request from a new device other than a plurality of devices configuring a network in which a plurality of devices including the information processing apparatus make wireless communication on a one-to-one basis to be mutually connected, transferring the connection authentication request to the plurality of devices and permitting the new device to connect to the network on the basis of the responses to the connection authentication request from the plurality of devices.

(17)

A program for causing a computer to perform a control procedure of, performs control receiving a connection authentication request from a new device other than a plurality of devices configuring a network in which the plurality of devices including the information processing apparatus make wireless communication on a one-to-one basis to be mutually connected, transferring the connection authentication request to the plurality of devices and permitting the new device to connect to the network on the basis of the responses to the connection authentication request from the plurality of devices.

REFERENCE SIGNS LIST

10 Communication system
100 to 107 Information processing apparatus
110 Communication unit
120 Detection unit
130 Operation reception unit
140 Control unit
150 Storage unit
160 Display unit
170 Speech output unit
200 Network
900 Smartphone
901 Processor
902 Memory
903 Storage
904 External connection interface
906 Camera
907 Sensor
908 Microphone 909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 Vehicle-mounted network
942 Vehicle module

The invention claimed is:

1. An information processing apparatus, comprising:
circuitry configured to:
configure a network with a plurality of devices, wherein the plurality of devices in the network wirelessly communicate on a peer to peer basis;
in a case the information processing apparatus receives a connection authentication request from a first device other than the plurality of devices,
transfer the connection authentication request to the plurality of devices; and
transfer a connection permission to the first device to connect to the network based on a plurality of responses from the plurality of devices;
in a case the information processing apparatus receives the connection authentication request from one of the plurality of devices, transfer a response of the plurality of responses to the one of the plurality of devices, wherein the response is associated with respond to the connection authentication request;
determine whether a second device of the plurality of devices leaves the network, wherein the second device has an authority to grant the connection permission; and
assign the authority to grant the connection permission from the second device to a third device of the plurality of devices based on the determination that the second device leaves the network.

2. The information processing apparatus according to claim 1, wherein the circuitry is further configured to grant the connection permission based on a plurality of major responses of the plurality of responses from the plurality of devices.

3. The information processing apparatus according to claim 1, wherein the circuitry is further configured to grant the connection permission based on of the plurality of responses from a number of devices having the authority to grant the connection permission among the plurality of devices.

4. The information processing apparatus according to claim 3, wherein the circuitry is further configured to set the authority to grant the connection permission to the number of devices among the plurality of devices.

5. The information processing apparatus according to claim 3, wherein the circuitry is further configured to:
set a priority of the authority to grant the connection permission; and
grant the connection permission based on the plurality of responses from the number of devices having the authority to grant the connection permission and having the priority that meets a standard.

6. The information processing apparatus according to claim 1, wherein
in a case of a reception of the connection authentication request,
the plurality of devices notifies a user of the reception of the connection authentication request, and
the plurality of devices determines the response based on an approval operation of the user for the connection authentication request.

7. The information processing apparatus according to claim 1, wherein in a case of reception of the connection authentication request, the plurality of devices generates the plurality of responses based on capability of the first device.

8. The information processing apparatus according to claim 1, wherein the circuitry is further configured to:
receive identification information from the first device; and
grant the connection permission to the first device to connect to the network based on the identification information.

9. The information processing apparatus according to claim 1, wherein in a case of reception of the connection authentication request, the plurality of devices transmits the plurality of responses to the connection authentication request to other devices than the plurality of devices and notifies a plurality of users of contents of the plurality of responses of the other devices.

10. An information processing apparatus, comprising:
circuitry configured to:
configure a network with a plurality of devices, wherein the plurality of devices in the network wirelessly communicate on a peer to peer basis;
transmit a connection authentication request to the network;
receive connection setting information from the network based on a plurality of responses from the plurality of devices, wherein
the connection authentication request is transferred to the plurality of devices in a case the connection authentication request is transmitted from a first device other than the plurality of devices,
a connection permission is transferred to the first device based on the plurality of responses from the plurality of devices,
a response of the plurality of responses is transferred to one of the plurality of devices in a case the connection authentication request is transmitted from the one of the plurality of devices,
a second device of the plurality of devices is determined to leave the network,
the second device has an authority to grant the connection permission, and
the authority to grant the connection permission is assigned from the second device to a third device of the plurality of devices based on the determination that the second device leaves the network; and perform a connection processing of to connect the first device to the network based on the connection setting information.

11. The information processing apparatus according to claim 10, wherein the circuitry is further configured to:
notify a user of information associated with the plurality of devices or the network; and
transmit the connection authentication request to at least one of the plurality of devices that configures the network, wherein
the at least one of the plurality of devices is selected based on a user selection operation, and
the connection authentication request is transmitted based on the notification of the information.

12. The information processing apparatus according to claim 10, wherein
the circuitry is further configured to perform control to transmit the connection authentication request to at least one of the plurality of devices that configures the network, and
the at least one of the plurality of devices is selected based on capability of the plurality of devices.

13. An information processing apparatus, comprising:
circuitry configured to:
configure a network with a plurality of devices, wherein the plurality of devices in the network wirelessly communicate on a peer to peer basis; and
determine an authentication device from among the plurality of devices that generates connection setting information to perform a connection processing among the plurality of devices, wherein
a connection authentication request is transferred to the plurality of devices in a case of reception of the connection authentication request from a first device other than the plurality of devices,
a response of a plurality of responses is transferred to one of the plurality of devices in a case of reception of the connection authentication request from the one of the plurality of devices,
a second device of the plurality of devices is determined to leave the network,
the second device has an authority to grant a connection permission, and
the authority to grant the connection permission is assigned from the second device to a third device of the plurality of devices based on the determination that the second device leaves the network.

14. The information processing apparatus according to claim 13, wherein the circuitry is further configured to determine the authentication device based on information included in a signal that provides notification of a presence of the authentication device.

15. An information processing method, comprising:
configuring a network with a plurality of devices, wherein the plurality of devices in the network wirelessly communicate on a peer to peer basis;
in a case of receiving a connection authentication request from a first device other than the plurality of devices, transferring the connection authentication request to the plurality of devices, and
transferring a connection permission to the first device to connect to the network based on a plurality of responses from the plurality of devices; and
in a case of receiving the connection authentication request from one of the plurality of devices, transferring a response of the plurality of responses to the one of the plurality of devices, wherein the response is associated with respond to the connection authentication request;
determining whether a second device of the plurality of devices leaves the network, wherein the second device has an authority to grant the connection permission; and
assigning the authority to grant the connection permission from the second device to a third device of the plurality of devices based on the determination that the second device leaves the network.

16. A non-transitory computer-readable medium having stored thereon computer-readable instructions, which when executed by an image processing device, cause the image processing device to execute operations, the operations comprising:
configuring a network with a plurality of devices, wherein the plurality of devices in the network wirelessly communicate on a peer to peer basis;
in a case of receiving a connection authentication request from a first device other than the plurality of devices, transferring the connection authentication request to the plurality of devices, and
transferring a connection permission to the first device to connect to the network based on a plurality of responses from the plurality of devices; and
in a case of receiving the connection authentication request from one of the plurality of devices, transferring a response of the plurality of responses to the one of the plurality of devices, wherein the response is associated with respond to the connection authentication request;
determining whether a second device of the plurality of devices leaves the network, wherein the second device has an authority to grant the connection permission; and
assigning the authority to grant the connection permission from the second device to a third device of the plurality of devices based on the determination that the second device leaves the network.

* * * * *